(12) United States Patent
Hong et al.

(10) Patent No.: US 6,935,160 B2
(45) Date of Patent: Aug. 30, 2005

(54) WATER LEAKAGE DETECTING SYSTEM FOR LIQUID PIPE AND METHOD THEREOF

(75) Inventors: In Sik Hong, Seongnam-Si (KR); Seung Soo Ha, Youngin-Si (KR)

(73) Assignee: Wacon Co., Ltd., Seongnam-Si (KR)

( * ) Notice: Subject to any disclaimer, the term of this patent is extended or adjusted under 35 U.S.C. 154(b) by 32 days.

(21) Appl. No.: 10/469,880

(22) PCT Filed: Jun. 4, 2002

(86) PCT No.: PCT/KR02/01058
§ 371 (c)(1), (2), (4) Date: Sep. 4, 2003

(87) PCT Pub. No.: WO03/076890
PCT Pub. Date: Sep. 18, 2003

(65) Prior Publication Data
US 2004/0098212 A1 May 20, 2004

(30) Foreign Application Priority Data
Mar. 14, 2002 (KR) ........................ 2002-13837

(51) Int. Cl.⁷ .................. G01M 3/04; G01N 27/82; G08B 21/00
(52) U.S. Cl. ................... 73/40; 73/40.5 R; 340/605; 324/240
(58) Field of Search ............. 73/40, 40.5 R, 73/49.1; 340/605; 324/240, 243

(56) References Cited

U.S. PATENT DOCUMENTS

| | | | | |
|---|---|---|---|---|
| 3,995,472 A | * | 12/1976 | Murray ...................... | 73/40 |
| 4,332,170 A | * | 6/1982 | Belval et al. ............. | 73/40.5 R |
| 4,570,477 A | * | 2/1986 | Sugibuchi ................. | 73/40.5 R |
| 5,203,202 A | * | 4/1993 | Spencer .................... | 73/40.5 R |
| 5,343,738 A | * | 9/1994 | Skaggs ..................... | 73/40.5 R |
| 5,918,267 A | * | 6/1999 | Evans et al. ............. | 73/40.5 R |
| 6,026,862 A | * | 2/2000 | Friedrich et al. ........... | 138/112 |

FOREIGN PATENT DOCUMENTS

| | | |
|---|---|---|
| JP | 57-31657 | 2/1982 |
| JP | 04-009651 | 1/1992 |
| JP | 09-236507 | 9/1997 |
| KR | 2000-003466 A | 6/2000 |

OTHER PUBLICATIONS

Copy of the International Search Report Established for PCT/KR02/01058.
Copy of the Korean Search Report Established for KR 2002/13837.

* cited by examiner

Primary Examiner—Hezron Williams
Assistant Examiner—Tamiko Bellamy
(74) Attorney, Agent, or Firm—Gardner Carton & Douglas LLP

(57) ABSTRACT

The present invention discloses water leakage detecting system for liquid pipe and method thereof. The present invention provides the present status for all liquid pipes by installing more than one liquid pipes, by laying under the ground, to which more than one conducting wires are inserted or fixed, transmitting pulse signal to each conducting wire using pulse transmitter, checking whether each liquid pipe is damaged or not and grasp the damaged points by inspecting the received signal.

23 Claims, 17 Drawing Sheets

FIG.2
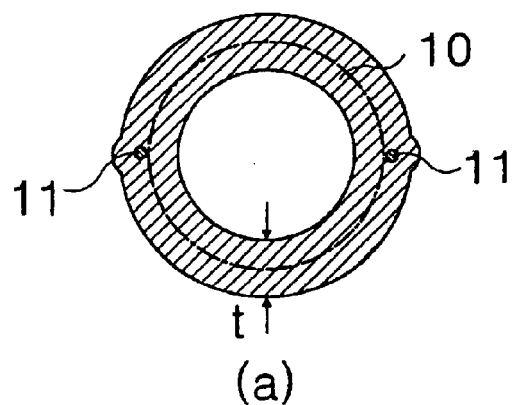
(a)
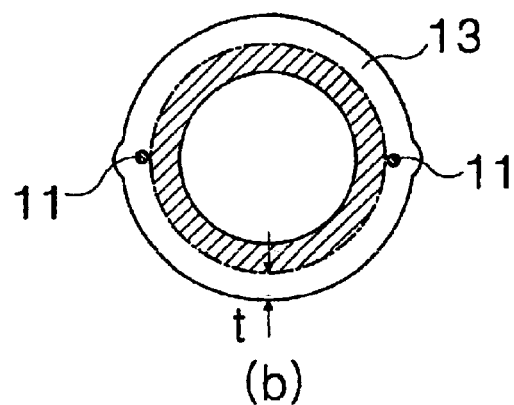
(b)
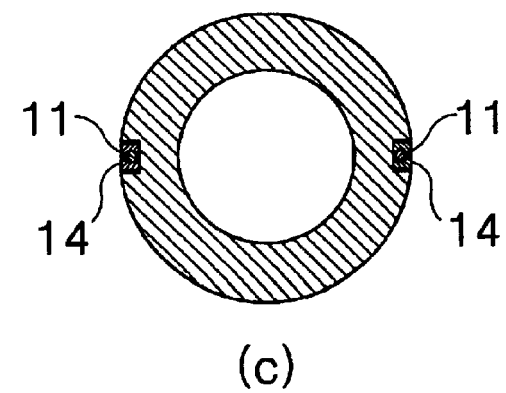
(c)

| No. | ID | Type | Length | Type of CW | Thickness of CW | Interval of CW | Length of CW | Initial location data |  |  |
|---|---|---|---|---|---|---|---|---|---|---|
|  |  |  |  |  |  |  |  | RT | Length of CW | Length of LP |
| 1 | P1 | ST | 20m | Cu | 0.5mm | 0.5m | 90m | 9s | 90m | 20m |
| 2 | P2 | ST | 20m | Cu | 0.5mm | 0.5m | 90m | 10s | 100m | 22m |
| 3 | P3 | CI | 30m | NiCr | 0.7mm | 0.5m | 130m | 14s | 140m | 32m |
| 4 | P4 | ST | 40m | Cu | 0.5mm | 0.5m | 170m | 18s | 180m | 42m |
| 5 | P5 | PE | 30m | Cu | 0.5mm | 0.3m | 140m | 15s | 150m | 32m |
| 6 | P6 | PE | 30m | Cu | 0.5mm | 0.3m | 140m | 15s | 150m | 32m |
| 7 | P7 | CI | 30m | NiCr | 0.7mm | 0.3m | 140m | 15s | 150m | 32m |
| 8 | P8 | ST | 30m | Cu | 0.5mm | 0.5m | 140m | 15s | 150m | 32m |
| 9 | P9 | ST | 25m | Cu | 0.5mm | 0.5m | 110m | 12s | 120m | 27m |
| 10 | P10 | ST | 30m | Cu | 0.5mm | 0.5m | 130m | 14s | 140m | 32m |
| 11 | P11 | PE | 35m | Cu | 0.5mm | 0.5m | 150m | 16s | 160m | 37m |
| 12 | P12 | ST | 35m | Cu | 0.5mm | 0.3m | 160m | 17s | 170m | 37m |
| 13 | P13 | PE | 35m | Cu | 0.5mm | 0.3m | 160m | 17s | 170m | 37m |
| 14 | P14 | PE | 35m | Cu | 0.5mm | 0.3m | 160m | 17s | 170m | 37m |
| 15 | P15 | CI | 35m | NiCr | 0.7mm | 0.3m | 160m | 17s | 170m | 37m |

CW : Conducting Wire    LP : Liquid Pipe    RT : Receiving Time
ST : Steel pipe    CI : Cast-iron pipe    PE : PE pipe
Cu : Copper wire    NiCr : Coated nichrome wire

FIG.15b

| No. | ID | Compensating location data | | | Whether or not damaged | Damaged type | Damaged location | Whether or not repaired |
|---|---|---|---|---|---|---|---|---|
| | | RT | Length of CW | Length of LP | | | | |
| 1 | P1 | 9.18s | 91.8m | 20.40m | X | – | – | – |
| 2 | P2 | 10.20s | 102.0m | 22.44m | X | – | – | – |
| 3 | P3 | 14.28s | 142.8m | 32.64m | – | – | – | – |
| 4 | P4 | 18.36s | 183.6m | 42.84m | O | Damaged | 32m | O |
| 5 | P5 | 15.30s | 153.0m | 32.64m | – | – | – | – |
| 6 | P6 | 15.30s | 153.0m | 32.64m | O | Water leakage | 26m | X |
| 7 | P7 | 15.30s | 153.0m | 32.64m | X | – | – | – |
| 8 | P8 | 15.30s | 153.0m | 32.64m | – | – | – | – |
| 9 | P9 | 12.24s | 122.4m | 27.54m | X | – | – | – |
| 10 | P10 | 14.28s | 142.8m | 32.64m | – | – | – | – |
| 11 | P11 | 16.32s | 163.2m | 37.74m | – | – | – | – |
| 12 | P12 | 17.34s | 173.4m | 37.74m | – | – | – | – |
| 13 | P13 | 17.34s | 173.4m | 37.74m | – | – | – | – |
| 14 | P14 | 17.34s | 173.4m | 37.74m | O | 누수 | 11m | O |
| 15 | P15 | 17.34s | 17.34m | 37.74m | – | – | – | – |

FIG.15c

| No. | ID | Type | Router ID | Liquid Pipe |
|---|---|---|---|---|
| ... | | | | ... |
| 1 | C1 | T | R1 | P1, P5, P2 |
| 2 | C2 | T | R2 | P2, P6, P3 |
| 3 | C3 | T | R3 | P3, P7, P4 |
| 4 | C4 | L | — | P4, P8 |
| 5 | C5 | T | R4 | P5, P12, P9 |
| 6 | C6 | + | R5 | P6, P9, P13, P10 |
| 7 | C7 | + | R6 | P7, P10, P14, P11 |
| 8 | C8 | T | R7 | P8, P11, P15 |
| 9 | C9 | + | R8 | P12, P19, P16 |
| 10 | C10 | + | R9 | P13, P16, P20, P17 |
| 11 | C11 | + | R10 | P14, P17, P21, P18 |
| 12 | C12 | T | R11 | P15, P18, P22 |
| 13 | C13 | T | R12 | P19, P23, P24 |
| 14 | C14 | T | R13 | P20, P24, P25 |
| 15 | C15 | T | R14 | P21, P25, P26 |
| 16 | C16 | L | — | P22, P26 |

WATER LEAKAGE DETECTING SYSTEM FOR LIQUID PIPE AND METHOD THEREOF

TECHNICAL FIELD

The present invention discloses water leakage detecting system for liquid pipe and method thereof. The present invention provides the present status for all liquid pipes by installing more than one liquid pipes, by laying under the ground, to which more than one conducting wires are inserted or fixed, transmitting pulse signal to each conducting wire using pulse transmitter, checking whether each liquid pipe is damaged or not and grasps the damaged points by inspecting the received signal.

BACKGROUND ART

As it is widely known, liquid pipes used in waterworks and drainage works are laid underground. These liquid pipes can be damaged on a certain part due to deterioration and other causes, and it is not easy to grasp whether or not the pipes are damaged or the exact damaged part because they are laid underground.

For instance, in the case of the waterworks, up to 20% of tap water is leaking since the old waterworks pipes are not changed. However, the existing water leakage detecting system has a difficulty in detecting a small amount of leakage as well as knowing the exact leaking position. The existing method of detecting water leakage is as follows.

First, there is a method of detecting it by a geophone. In this case, a tool such as a sound detector is used or the hearing sense of a skilled expert is used. When the sound of leakage is transmitted to the surface of the earth, it is detected on the earth to amplify the sound. Therefore, it is available to listen to the sound by a receiver or detect the leakage by analyzing it with a meter.

However, since it depends on the sound detector or the hearing sense of a human being, it is possible to detect water leakage over the regular amount. Furthermore, the conduit of a waterworks pipe is supposed to be laid underground at less than 1.2 meters above the ground, making it difficult to detect water leakage when water leaks in a small quantity and to exactly detect the leaking area. In addition, in the case of the conduit of the waterworks pipes installed under the ground of the roads having heavy traffic instead of the exclusive sites, it is almost impossible to detect water leakage because traffic noise is transmitted as well.

Second, there is a method of detecting moisture leaking outside by a sensor when water leaks, by installing the moisture-detecting sensor outside of the pipes. A method of using a sound wave or the moisture-detecting sensor is done in a pipe attaching way, thereby immediately knowing water leakage through alarm signals. Thus, this method can be used for online monitoring. However, it is not easy to install the moisture-detecting sensor outside of the pipes since the soil contains water in itself.

Third, there is a method of separating the pipelines from the pipe networks by using the bypass line to inspect water leakage. With this method, the one end of the pipelines is closed after separating the pipelines, and an opening whose diameter is slightly bigger than the inside diameter of the pipe is pushed by water pressure. When it reaches the water leaking area, the opening is not pushed any more. That is, if the opening pushed by water pressure is not pushed any more, it means there is a leaking part on the spot.

But, when more than two separated leaking parts exist, it is difficult to detect the position of the middle leaking area or it is almost impossible to detect minute pipe cracks such as stress corrosion cracks, requiring a lot of time.

In the case of the drainage works, the soil can be polluted when water leaks. Unlike the waterworks, there are many artificial reasons for water leakage of the drainage works: wrong joining due to joining failure between the pipes; other pipe passing when the gas pipe passes through the drain pipes; joining part detachment due to the detached joining part between the pipes; and other foreign substance infiltration. To inspect these errors, it is common to use a method of searching the error-generated parts by CCTV, however it is necessary to dig the laid position over to inspect the errors with the existing methods, causing inconvenience of using inspection equipment.

In addition, a system of providing information on the status of each waterworks/drainage work forming the entire waterworks network to the manager in bulk and inspecting the waterworks/drainage works is not built yet, therefore the manager should inspect the pipe lines of each waterworks/drain work when malfunction occurs, causing efficiency deterioration and the increase of time and cost.

To solve the above problems, a technology of connecting sensing elements around various kinds of pipes including liquid pipes is suggested on the U.S. Pat. No. 6,265,880, and the above patent details a method of checking whether or not the pipes have defects by using bridge resistance. However, the above US patent has a problem of applying to liquid pipes laid underground, having connection holes after cutting the pipes while laying them underground

DISCLOSURE OF INVENTION

To solve the above problems, it is an object of the present invention to provide liquid pipes easily detecting water leakage while laid underground; many liquid pipes and liquid pipe networks suggesting a wiring method of connecting with the liquid pipes; water leakage detecting system for managing the liquid pipe networks; and a method of building a database for the length of each liquid pipe and a leakage detecting method.

To achieve the above objects, the present invention provides a liquid pipe for detecting water leakage comprising: a liquid pipe having outer circumference of a predetermined thickness 't' and composed of an inner surface and an outer surface; having a liquid pipe where liquids flow into the inner empty space formed on the inner surface; and at least one pair of conducting wires laid on outer circumference, and wherein the outline of the laid conducting wires is projected in the shape of prominence out of the outer surface. More desirably, it is better to lay the conducting wires at less than t/2 from the outer surface. Also, it is more desirable to install connecting parts on the outer surface far away from a lead-in entrance where liquids flow in and an outlet where liquids flow out of the liquid pipe, for connecting the conducting wires with neighboring liquid pipes, and to have a connection part for an easy electric connection between the conducting wires of the neighboring liquid pipes.

This connection part is formed on the outer surface where the conducting wires are projected, and an insertion groove is formed in a liquid pipe to expose the laid conducting wires. An adhesive layer is formed on the bottom of the connection part to adhere to the insertion groove.

The liquid pipe for detecting water leakage suggested in the present invention has: a liquid pipe having outer circumference of a predetermined thickness, composed of an inner surface and an outer surface; and the liquid pipe wherein liquids flow into the inner empty space formed on the inner surface; a protection layer coated on the outer surface of the liquid pipe with regular thickness; and at least one pair of conducting wires laid in the protection layer. The outline of the laid conducting wires is projected in the shape of prominence out of an outer surface of the protection layer. This liquid pipe is mainly made of steel.

For another embodiment of a liquid pipe for detecting water leakage suggested in the present invention, there is a liquid pipe for detecting water leakage having: a liquid pipe having outer circumference of a predetermined thickness, composed of an inner surface and an outer surface; a liquid pipe wherein liquids flow into the inner empty space formed on the inner surface; and a groove with a predetermined depth, formed along the outer surface of the liquid pipe. This liquid pipe further has at least one pair of covered conducting wires formed in the groove with the predetermined depth, and maintaining an electrically insulated state with the liquid pipe by electric nonconductors.

To accomplish the present invention, a water pipe for easily detecting water leakage is provided to join neighboring PE lines together as spirally rotating the PE lines with line shapes, and a section cut the water pipe in the vertical direction of a length direction for the PE lines, comprising: a first PE layer constituting one boundary side; filling materials filled in the first PE layer, being made of insulators; one pair of conducting wires inserted between the filling materials as an insulated state; and a second PE layer firmed in an outer layer of the first PE layer.

It is desirable for a melting point and solidity of the second PE layer formed on the water pipe to be lower and higher than the first PE layer, respectively.

The above objects can be accomplished by providing a liquid pipe network easy water leakage detecting composed of many liquid pipes having a lead-in entrance and an outlet, and inner part of the liquid pipes being empty, comprising: the many liquid pipes having more than one conducting wires being fixed or inserted between the lead-in entrance and the outlet; connection pipes physically connecting each liquid pipe; routers turning on/off the electrically connected state of each conducting wire installed on each liquid pipe connected by the connection pipes with an externally transmitted control signal, and setting a transmission path of signals transmitted through the conducting wires; and a pulse tester connected to one end of the conducting wires to deliver pulse signals to the conducting wires, receiving pulse signals reflected from the end of the conducting wires, and having an inherent ID. The router has many connectors connected to each conducting wire installed on each liquid pipe; a switch turning on/off the electrically connected state of each connector by a control signal; and a controller operating the switch by the control signal. Of course, it is desirable to further have a receiver for receiving the control signal in the router. By adding a function of shorting the conducting wires installed on a selected liquid pipe, the router can be used as a calibrator.

It is desirable for the pulse tester to have a transmitter for transmitting the reflected pulse signals and the ID.

The liquid pipes used in the present invention can be connected in order of locating the first liquid pipe and the second liquid pipe in the determined position, and physically connecting an outlet of the first liquid pipe and a lead-in entrance of the second liquid pipe, then electrically connecting the first liquid pipe with the second liquid pipe. Therefore, it is desirable to make connection steps composed of: a connector installation step of forming an insertion groove in a predetermined position of a coating layer to expose the conducting wires, and installing connecting parts electrically connected with the conducting wires on the insertion groove; and a step of electrically connecting each connecting part of two liquid pipes.

A water leakage detecting system suggested in the present invention is a system for detecting water leakage of liquid pipes to detect whether or not water leaks in each liquid pipe constituting the entire liquid pipe network and a leaking area, and to display the results, comprising: a field system transmitting a receiving signal by delivering pulse signals to each liquid pipe; and a central management system deciding whether or not any defects are generated in each liquid pipe by analyzing the receiving signal, calculating a defect-generated position when a defect is generated, and informing of the defect. The field system comprises: a liquid pipe having a lead-in entrance and an outlet; and having more than one conducting wires between the lead-in entrance and the outlet; and a pulse tester connected to one end of the conducting wires to deliver pulse signals to the conducting wires, and receiving a reflected signal. Many connecting parts connecting the liquid pipes are further comprised, and the connecting parts comprises a wireless receiver receiving a control signal for controlling the connection of each conducting wire installed in each liquid pipe from outside; and a switch part having many connectors connected to each conducting wire, and turning on/off the electric connection of each connectors according to the control signal.

The central management system has a pipe network database including information on a connection method of each liquid pipe and length thereof; and a central processing unit detecting whether or not water leaks in each liquid pipe by analyzing a receiving signal.

For constructing method for liquid pipe information data according to the present invention, comprises the steps of: applying a switching signal to the router; receiving the reflected pulse signals from a pulse tester linked to the liquid pipe network connected according to the switching signal; calculating length of the conducting wires of the liquid pipes and length of the liquid pipes through a receiving time of the reflected pulse signals; and storing the calculated length of the liquid pipes. More desirably, before the step of applying the switching signal to the router, the constructing method further comprises the steps of storing liquid pipe network information. The liquid pipe network information includes information on identifier, kind, length, and laid position of each liquid pipe constituting the liquid pipe network, information on kind and length of the conducting wires installed in each liquid pipe, and an identifier of the router.

In addition, the calculating step is composed of the steps of: calculating the length of the conducting wires of the first liquid pipe by using a receiving time of the reflected pulse signals; and calculating the length of the first liquid pipe by using the calculated length of the conducting wires of the first liquid pipe.

The length of the conducting wires of the liquid pipes in accordance with the present invention changes by temperature, causing an obstacle to exactly detect a leaking position. Therefore, to compensate the length change in accordance with temperature, the present invention suggests a compensating method for length changes of reference length information for length of each liquid pipe of a liquid pipe network due to temperature comprising the steps of: receiving the reflected pulse signals from a first optional liquid pipe constituting the liquid pipe network; calculating length of the first liquid pipe by analyzing a receiving time of the reflected pulse signals; comparing the calculated length of the first liquid pipe with length of a first liquid pipe stored in the reference length information, and calculating a changing rate; and updating reference length information of each liquid pipe constituting the liquid pipe network by using the changing rate.

Thus, the present invention has adopted a detecting method for a leaking area of a liquid pipe network by using reference length information for length of each liquid pipe of the liquid pipe network according to the present invention, comprising the steps of: compensating differences of the reference length information of each liquid pipe constituting the liquid pipe network owing to temperature; delivering a control signal to routers to set a path of a liquid pipes to detect water leakage; receiving reflected pulse signals from the pulse tester installed in the set path; and calculating an exact leaking area from the reflected pulse signals.

For a detecting method for a leaking area, the step of compensating differences of the reference length information comprising the steps of: receiving the reflected pulse signals from a predetermined first liquid pipe of the liquid pipe network; calculating length of the first liquid pipe by analyzing a receiving time of the reflected pulse signals; comparing the calculated length of the first liquid pipe with length of the first liquid pipe stored in the reference length information to calculate a changing rate, and updating the reference length information of each liquid pipe by using the changing rate.

A system for detecting water leakage in a liquid pipe network according to the present invention comprises: a pipe network database including liquid pipe information including reference length information of the each liquid pipe constituting the liquid pipe network, router information and pulse tester information; and a server system compensating differences of the reference length information owing to temperature by using the reflected pulse signals transmitted from the pulse tester of the liquid pipe network, delivering a control signal to the routers to set a path of the liquid pipes whose water leakage is detected, receiving the reflected pulse signals from the pulse tester formed in the set path for detecting water leakage, and calculating an exact water leaking area from the reflected pulse signals. For information stored in the pipe network database, information on identification of each liquid pipe, kind, length and laid position as well as kind and length of conducting wires formed on each liquid pipe is included in information on the liquid pipes; information on identification and installation position is included in routers information; and information on identification and installation position is included in the pulse tester information. And for the compensation of differences of said reference length information owing to temperature, the compensation is implemented by receiving the reflected pulse signals of the pulse tester from a predetermined first liquid pipe of the liquid pipe network, calculating length of the first liquid pipe by analyzing a receiving time of the reflected pulse signals, comparing the calculated length of the first liquid pipe with the length of the first liquid pipe stored in the reference length information of the pipe network database to calculate a changing rate, and updating the reference length information of each liquid pipe by using the changing rate.

BRIEF DESCRIPTION OF DRAWINGS

FIGS. 2a through 2c are sectional views of water leakage detecting liquid pipes classified by manufactured materials of liquid pipes in accordance with the present invention.

FIG. 15 is an explanatory diagram of presenting the stricture of a pipe network database.

BEST MODE FOR CARRYING OUT THE INVENTION

The advantages, characteristics and preferred embodiments of the present invention will be described more fully hereinafter with reference to the accompanying drawings.

Figure 1:
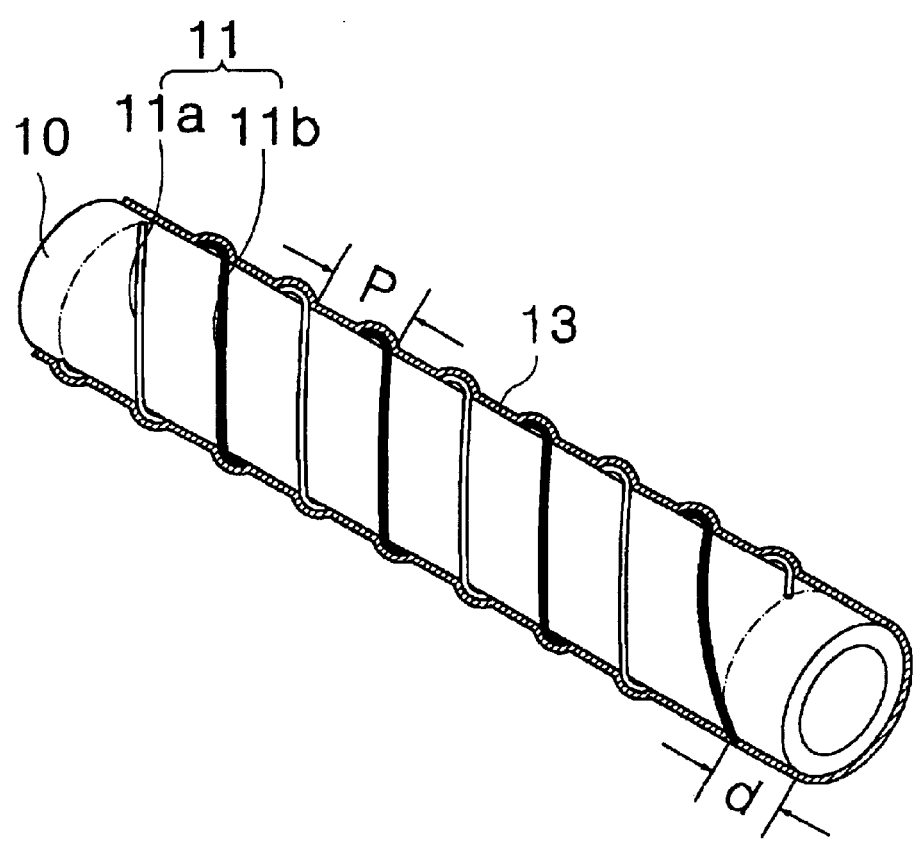
FIG. 1 is an external perspective view of a water leakage detecting liquid pipe in accordance with the present invention.

FIG. 1 is an external perspective view of a water leakage detecting liquid pipe in accordance with the present invention. As shown in FIG. 1, a water leakage detecting liquid pipe(10) in accordance with the present invention is formed as spirally winding one pair of conducting wires(11a, 11b) on an external part of the liquid pipe along an outer circumference. Desirably, the one pair of conducting wires have to be wound, separated from each other at regular intervals to keep a uniform pitch(P). At this time, the spirally wound conducting wires have another protection layer(13) not to be contacted with an external surface. This is for preventing the conducting wires from being damaged even when waterworks pipes are contacted with the ground while carrying them. In addition, it is desirable to lay the spirally wound conducting wires(11) at a certain distance(distance 'd' from FIG. 1) from a lead-in entrance and an outlet of the liquid pipe, however it is allowable to entirely lay them up to the external section of the lead-in entrance and the outlet. In the existing technology, the end of laid conducting wires was exposed to outside to pre-form an external connecting part for connecting with an external test device while laying the conducting wires(11).

However, like mentioned above, there is a problem of damaging the externally exposed wires(11) or the connecting part while carrying a heavy liquid pipe, since the liquid pipe(10) should be carried to a laying position. A liquid pipe in accordance with the present invention uses a system of forming a connecting part for connecting with a neighboring liquid pipe after arranging the liquid pipe(10), therefore it is necessary to easily grasp a position where the conducting wires are laid. To achieve this, the upper surface of the laid position of the conducting wires(11) should be projected to know the laid position when seeing from an external surface (protection layer; 13). It is possible to naturally project it while manufacturing by the thickness of the laid conducting wires.

The conducting wires(11) in accordance with the present invention are very thin, and coated with nonconductors when necessary. The used conducting wires(11) have a maximum thickness of 1 mm, and desirably 0.5 mm in thickness. If the thickness of the conducting wires(11) is over 1 mm, they cannot be disconnected as water leaks even when cracks are generated in the liquid pipe(10). Therefore, in the case of the conducting wires(11) having the thickness mentioned above are disconnected by water pressure when cracks are generated in the liquid pipe(10), and the conducting wires(11) become submerged when water leaks in the liquid pipe(10). The conducting wires(11) are mainly made of copper lines, but nichrome wires or nonconductors are coated when the liquid pipe(10) is made of a cast-iron pipe, because an electric current is well turned on in the liquid pipe(10) in itself. More desirably, the wires(11) are coated with tar with adhesion force as nonconductor.

When using the liquid pipe(10) as a waterworks pipe, it is made of steel pipe, cast-iron pipe, PE(Poly Ethylen) pipe, Hi-3P impact resistance water pipe, stainless steel pipe, PE steel pipe, etc. Since common experts in the technology field of the present invention easily know each of these pipes, the detailed explanation has been omitted. In terms of PE pipes, steel pipes, and cast-iron pipes commonly used as the waterworks pipes, a method of inserting conducting wires applied to the present invention will be explained as follows.

FIG. 2a is a sectional view of a PE pipe, generating the PE pipe by injection-molding it as compressing PE(10). Generally, the temperature of the PE pipe is about 600° C. while manufacturing the PE pipe, thereby injection-molding it by inserting the conducting wires(11) into a proper position. At this time, the inserted conducting wires(11) are located between t/5 to t/2 from an external layer, given the total thickness of the PE pipe is 't'. When they were laid closer to the external layer than t/5, there was a risk of damaging the conducting wires while carring them, and if they were located in more inner side than t/2, a position where the conducting wires were laid could not be confirmed from outside. In addition, in the case of a small crack generated on the inner side only of the PE pipe instead of being generated up to the external surface, water does not leak while conveying liquids, however when the conducting wires are located in more inner side than t/2, there is a possibility of misunderstanding that water leaks due to the crack generated in the inner side only.

FIG. 2b illustrates a sectional view of a steel pipe, and the steel pipe is welded in the state of winding a thin stainless steel plate(10) into a circle, then 5 to 6 PEs or PVC coating layers(13) are formed on the external layer. The formed PEs or the PVC coating layers have a thickness of at least more than 5 mm, and if possible, the laid conducting wires(11) are laid in the position closer to the external circumference of the steep pipe(10). By closely locating them to the external circumference of the steel pipe(10), the state of the steel pipe can be transmitted to the conducting wires(11) more exactly, and when the conducting wires are laid far away from the external circumference of the steel pipe(10), there is a problem of weakening them by external impact. In the case of the steel pipe, the conducting wires(11) are laid between the coating layers(13) like shown in FIG. 2b, and they are laid deeper than t/2 from the external circumference of the coating layers, given the thickness of the coating layers(13) is 't'.

FIG. 2c illustrates a cast-iron pipe, and the cast-iron pipe is made by hardening it as rotating the cast-iron pipe after pouring a cast-iron product into a frame. Since the melting temperature of the cast-iron pipe is over 1000° C., there is a difficulty in laying the conducting wires(11) such as PE pipes inside the pipe or forming PE coating layers like the steel pipe. Therefore, in the case of the cast-iron pipe, a groove is preset to insert tar wires with an approximately 1 cm of line width and 5 mm in thickness, and then the tar wires(14) having the conducting wires(11) inside are attached inside along the external groove after manufacturing the cast-iron pipe(10).

Figure 3:
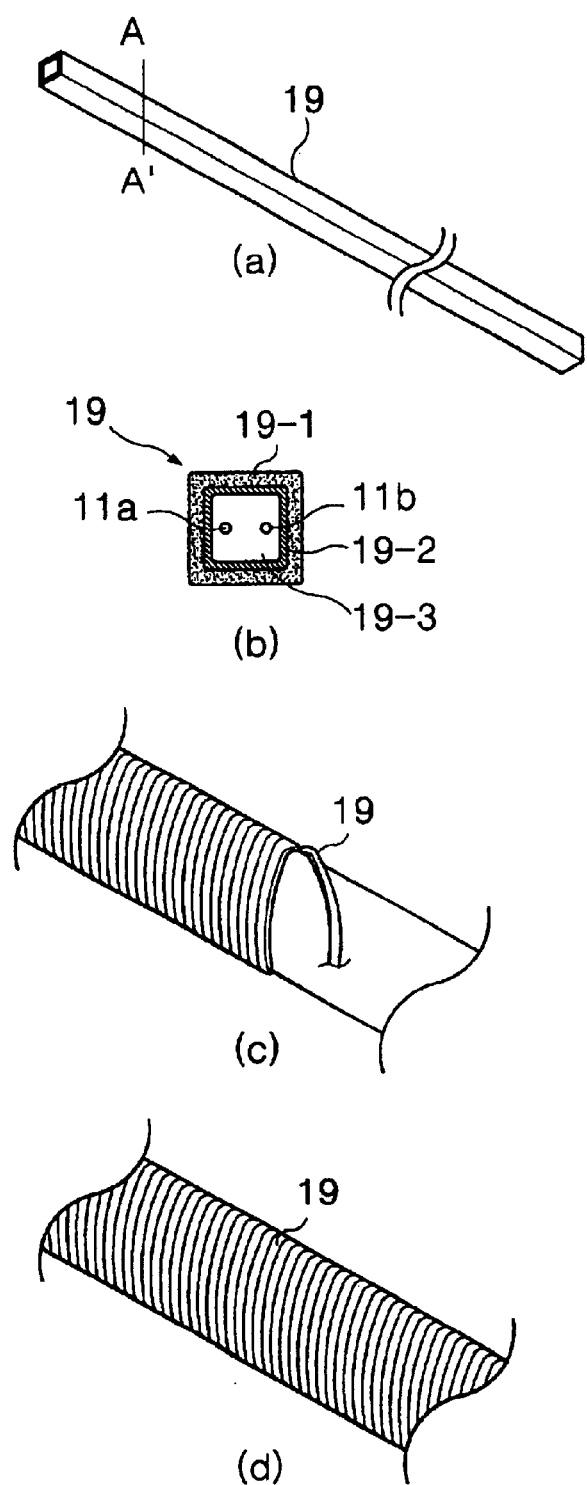
FIG. 3 is an embodiment of a water pipe in accordance with the present invention.

FIG. 3 is an embodiment of a water pipe in accordance with the present invention. The water pipe uses a long rectangular PE line(19) like shown in FIG. 3(a). FIG. 3(b) presents a sectional view of A–A' direction of FIG. 3(a), and a PE cluster(19-2) having a little strength is formed like shown in the sectional view. Filling materials(19-3), the electric nonconductors are inserted into the cluster, and one pair of conducting wires(11-a, 11-b) are inserted between the filling materials(19-3) as keeping the insulated state. The water pipe tends to be destroyed by artificial factors rather than natural aging process, therefore it is desirable to use conducting wires over about 1 mm thicker than the conducting wires inserted into the waterworks pipes.

Outside the PE cluster, a PE layer(19-1) melted at a lower temperature than the PE cluster(19-2) is formed. It is desirable for the strength of a PE layer to be higher than that of the externally formed PE layer(19-1). The water pipe in accordance with the present invention is made as the PE layer(19-1) is melting like shown in FIG. 3(d) by spirally winding the long PE line along the outer circumference of a cylinder-shaped frame when the PE layer(19-1) melts like shown in FIG. 3(c).

Figure 4:
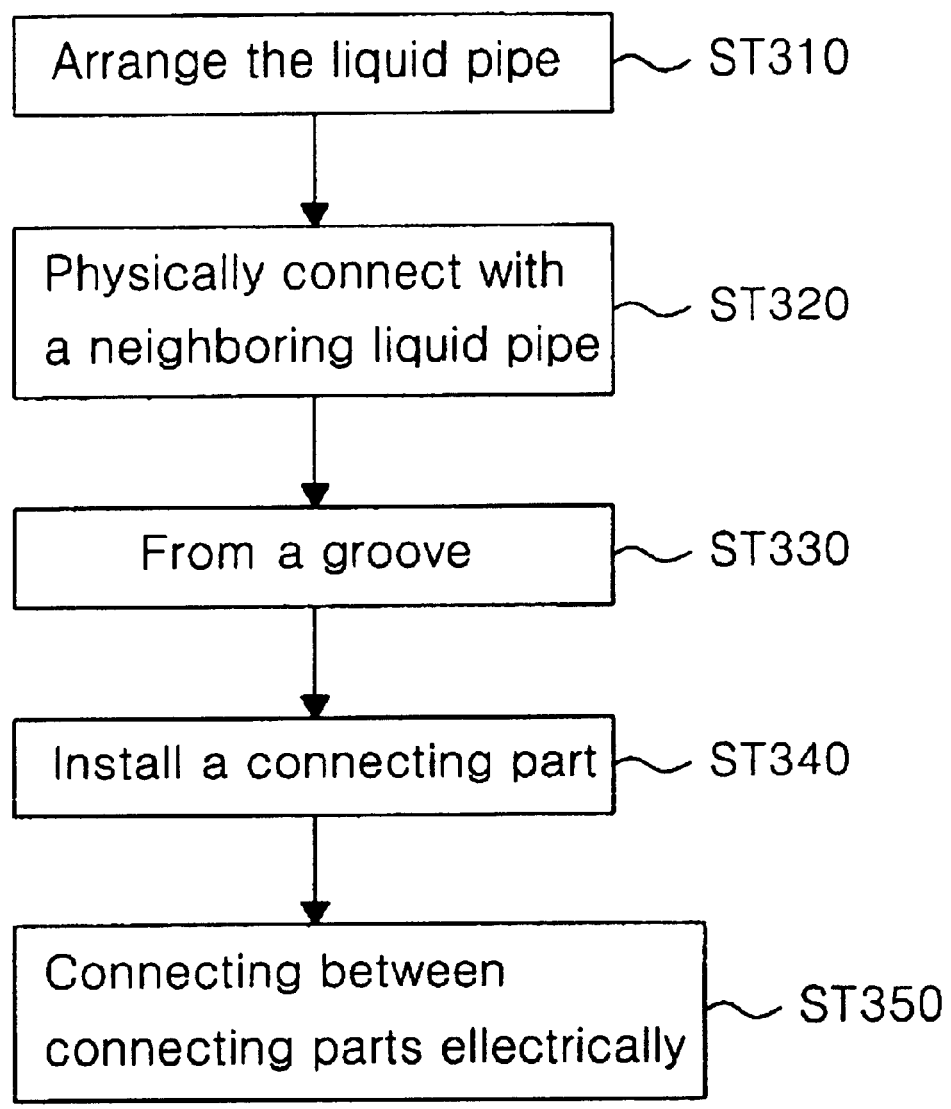
FIG. 4 is a flow of explaining connection between neighboring liquid pipes together in accordance with the present invention.

The liquid pipe in accordance with the present invention has adopted a system of installing a connection opening after carrying the liquid pipe to the spot. The order of the above process will be explained by using a flow of FIG. 4. Firstly, arrange the liquid pipe in an installing position(ST310). Physically connect the arranged liquid pipe with a neighboring liquid pipe(ST320). Up to here, complete the connection of the liquid pipes in the same method of laying the liquid pipes as the existing method. Next, grasp the position where the conducting wires of the liquid pipe(10) are laid, then form a groove to expose the conducting wires(11) by punching the upper area of the conducting wires being laid(ST330). At this time, a depth controlling punch should be used not to punch the liquid pipe itself by properly controlling the punched depth. Next, install a connecting part connected to the exposed conducting wires(11)(ST340). The liquid pipes are electrically connected to each other by connecting the connecting part installed in the neighboring liquid pipes with another covered conducting wires(ST350). It is desirable to have routers between the neighboring liquid pipes as follows, rather than directly connecting them.

Figure 5:
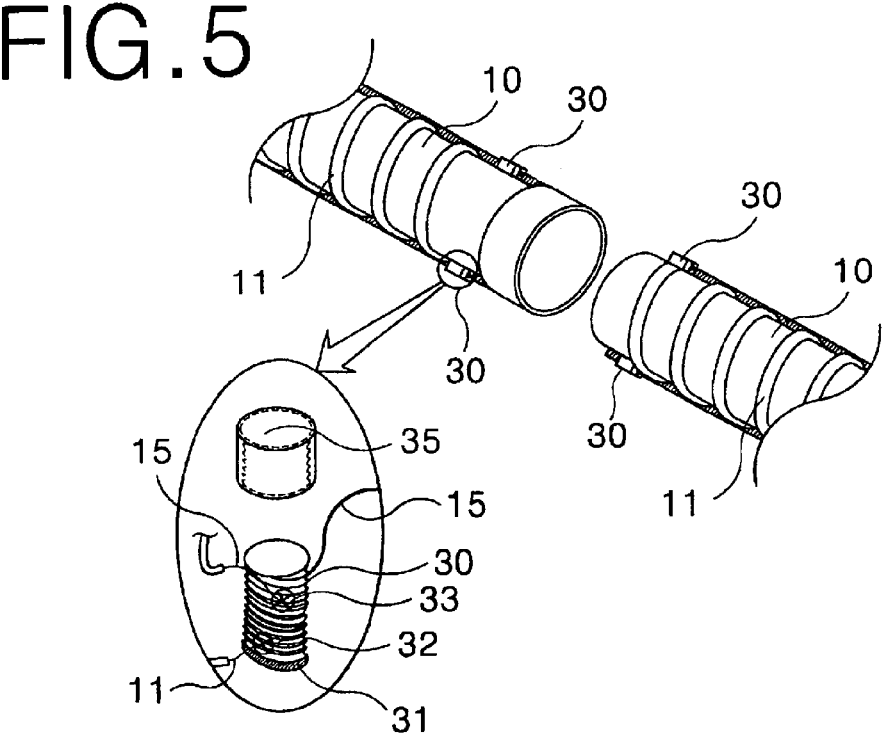
FIGS. 5 through 7 are diagrams of presenting embodiments of connectors formed in a water leakage detecting liquid pipe in accordance with the present invention.

FIG. 5 illustrates an embodiment of a connecting part formed in a liquid pipe of the present invention. A water leakage detecting liquid pipe in accordance with the present invention forms a punched insertion groove to expose conducting wires(11), and has a connecting part(30) contacted with the bottom of the insertion groove. In FIG. 5, the conducting wires(11) spirally winding on the outer circumference of the liquid pipes(10) is illustrated as if they seem to be exposed, but this is just for convenience of easy explanation: substantially, the conducting wires are covered with a protection layer, making it impossible to see from outside. The connecting part(30) has an adhesive layer(31) on the bottom, an insertion groove(32) for inserting the conducting wires(11) laid in the liquid pipes(10) in the lower part, and an insertion groove(33) for inserting covered conducting wires(15) connected with the neighboring liquid pipes(10) in the upper part. When the conducting wires(11) are connected with the conducting wires(15) in the lower insertion groove(32) and the upper insertion groove(33), respectively, the neighboring liquid pipes(10) are electrically connected to each other. At this time, a spiral can be formed on an outer circumference of the connecting part(30) instead of the insertion grooves(32, 33), and the conducting wires(11, 15) can be wound around the spiral. Also, it is possible to cover an upper part of the connecting part(30) with a protection cap(35) to firmly fix the conducting wires(11). Desirably, the connecting part(30) and the protection cap(35) are cylinder-shaped, and screw grooves such as bolt/nut are formed on an inner side of the protection cap(35) and an external side of the connecting part(30). The connecting part(30) is formed as many as the number of the conducting wires(11) on both ends of the liquid pipes(10).

Figure 6:
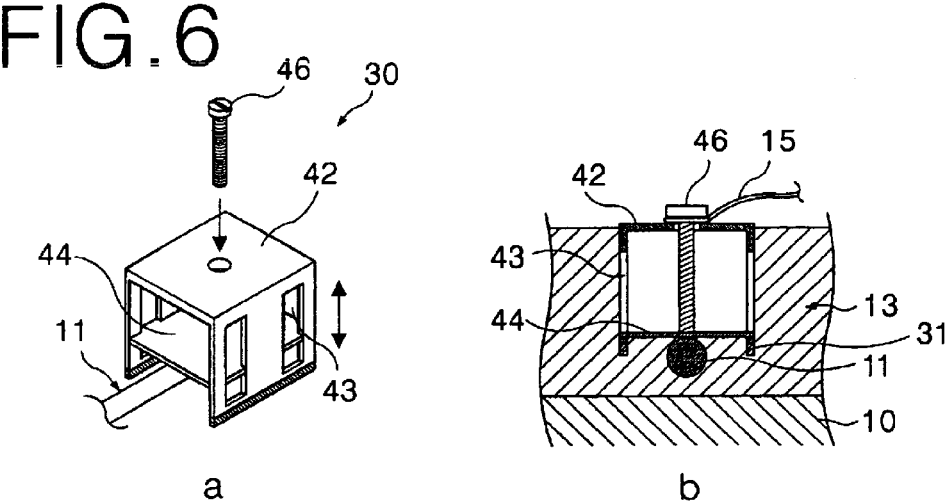

FIG. 6 illustrates another embodiment of a connecting part formed in a liquid pipe of the present invention. FIG. 6(a) is a perspective view of the connecting part, and FIG. 6(b) illustrates the installation of the connecting part in a steep pipe: the connecting part is inserted into a coating layer(13). Like shown in FIG. 6, the connecting part(30) in accordance with the present invention is inserted into an insertion groove formed on one end of a liquid pipe(10). A lower end of the connecting part is fixed into the PE coating layer(13) of the liquid pipe(10) by an adhesive(31). Desirably, the size of the connecting part(30) is the same as that of the insertion groove. That is, a cross section of the connecting part(30) is the same as that of the insertion groove, thereby preventing the connecting part(30) from moving or being separated from the insertion groove as well as preventing it from being projected to outside of the insertion groove by making the height of the connecting part same as the depth of the insertion groove. Once the connecting part(30) is installed, downwardly insert a fixing screw(46) through a screw hole formed on an upper surface of a supporting unit(42), to closely contact a connection plate(44) with conducting wires(11). When forming an insertion groove by using a punch, the conducting wires are exposed in a lower part of the insertion groove since the punch removes the PE coating layer(13) up to a position of the conducting wires(11). In addition, the connection plate (44) vertically moves along a bonding hole(43) located in the side of the supporting unit(42), thereby electrically connecting with the conducting wires(11) by going down to it. The fixing screw(46) hinders the connection plate(44) from being disconnected from the conducting wires(11). Therefore, it can maintain the electrical connection between the connection plate(44) and the conducting wires(11).

Connection lines(15) made of conductors are connected to the head of the fixing screw(46). Desirably, fix the connection line by winding the connection lines in a lower part of the fixing screw(46) and downwardly inserting the fixing screw(46) to an upper surface of the supporting unit(42). A connecting work of the connection lines(15) can be done at any time while installing the connecting parts(30). When completing the installation of the connecting parts(30) of both liquid pipes and the connection of the connection lines(15), complete the connection by electrically coupling each connection line(15) linked to each connecting part(30) of both liquid pipes(10). The connection plate(44), the fixing screw(46), and the connection lines(15) are made of conductors, and desirably they are made of materials same as the conducting wires(11). In addition, it is available to make the supporting unit(42) with conductors like the conducting wires(11).

Figure 7:
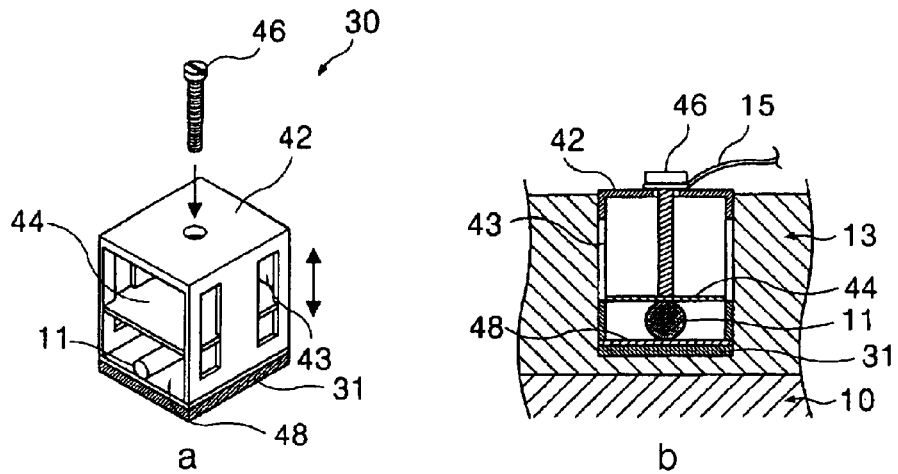

FIG. 7 is another embodiment of connecting parts, and FIG. 7(a) is a perspective view of another embodiment of the connecting parts, then FIG. 7(b) is a sectional view of the connecting parts(30) being inserted to a coating layer by applying it to a steel pipe. Like shown in FIG. 7, another embodiment of the connecting parts in accordance with the present invention is as follows. The connecting parts are inserted into an insertion groove formed on one side of a liquid pipe(10), and a lower surface of a supporting plate(48) is fixed into a PE coating layer(13) of the liquid pipe(10) by an adhesive(31). When the connecting parts are installed, the conducting wires(11) are fixed between the supporting plate (48) and a connection plate(44) by downwardly inserting a fixing screw(46) through a screw hole formed on an upper surface of a supporting unit(42). When forming an insertion groove by using a punch, the conducting wires(11) can be inserted between the supporting plate(48) and the connection plate(44) since the punch removes the PE coating layer(13) up to a position of the conducting wires(11) and lifts up the conducting wires(11) by cutting one side of the conducting wires. Also, the connection plate(44) vertically moves along a bonding hole(43) on the side of the supporting unit(42), thereby implementing electric connection by downwardly connecting with the conducting wires(11). The fixing screw(46) prevents the electric connection from being released by unfixing the conducting wires(11) between the supporting plate(48) and the connection plate(44). Thus, the electric connection of the connection plate(44) and the conducting wires(11) is maintained.

Connection lines(15) made of conductors are connected to the head of the fixing screw(46). Desirably, fix the connection lines by winding the connection lines in a lower part of the head of the fixing screw(46) and downwardly inserting the fixing screw(46) to a screw hole on an upper surface of the supporting unit(42). A connecting work of the connection lines(15) can be done at any time while installing the connecting parts. When completing the installation of the connecting parts of both liquid pipes and the connection of the connection lines(15), electrically connect each connection line(15) connected to each connecting part of both liquid pipes(10). Desirably, the connection lines(15) are spirally wound along an outer circumference of the liquid pipes(10).

The connection plate(44), the fixing screw(46), and the connection lines(15) are made of conductors, and desirably they are made of materials same as the conducting wires(11). In addition, it is available to make the supporting unit(42) and the supporting plate(48) with conductors like the conducting wires(11).

Figure 8:
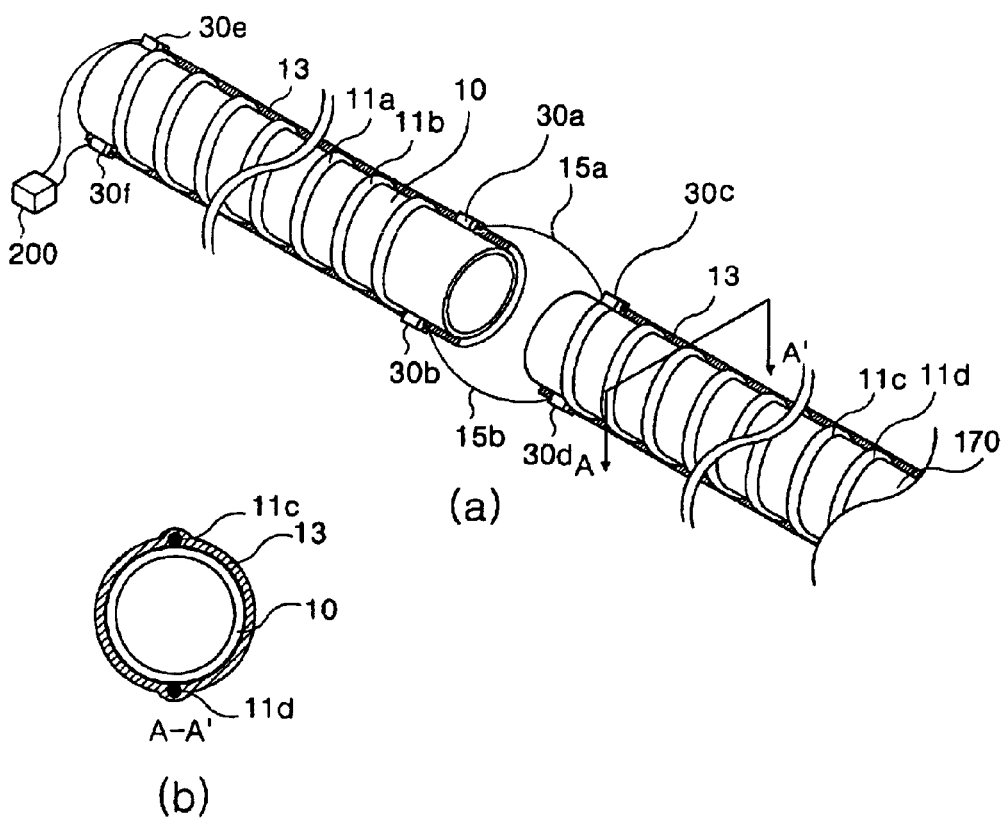
FIG. 8 is a state diagram of illustrating the state of reciprocally connecting two liquid pipes.

FIG. 8 is a state diagram of illustrating the state of reciprocally connecting two liquid pipes. FIG. 8(a) illustrates the reciprocally connected state of liquid pipes(10, 170), and the liquid pipe(10) has one pair of conducting wires(11a, 11b) and four connecting parts(30a, 30b, 30e, 30f). The liquid pipe(170) has one pair of conducting wires (11c, 11D) and four connecting parts (30c, 30d, the rest are not shown). The connecting part(30a) and the connecting part(30c) are connected by using a connection line(15a), and the connecting part (30b) and the connecting part(30d) are connected through a connection line(15b), respectively. A pulse tester(200) for detecting whether or not water leaks is formed in connecting parts(30e, 30f) of the liquid pipe(10). FIG. 8(b) illustrates an A–A' sectional view of the liquid pipe(170), having one pair of conducting wires(11c, 11d) with the same pitch, thereby implementing approximately 180 degrees for one pair of conducting wires. For this reason, the connecting parts of the liquid pipes have approximately 180 degrees.

To detect whether or not a liquid pipe is damaged according to the present invention, the pulse tester(200) is installed on one end of liquid pipe lines connected to each other, and conducting wires of the other end(connecting part of the liquid pipe(170) that is not shown in the diagram) are grounded or shorted out. Therefore, pulse signals delivered from the pulse tester(200) are transmitted through conducting wires of each liquid pipe, and are returned from an end of conducting wires of a final liquid pipe. It is calculated whether or not a liquid pipe is damaged or a damaged position by analyzing waveform and receiving time of the received pulse signals.

The pulse signals used in the pulse tester(200) include square wave, saw tooth wave, or sine square wave, and it is selected according to the kind of a tester. Desirably, the sine square wave having the lowest harmonics is used. In addition, the maximum measuring distance of the pulse tester is about 100 km in the present technology. Thus, when conducting wires are spirally formed to detect water leakage according to the present invention, it is possible to inspect a liquid pipe with dozens of kilometers with one pulse tester. The length of a measured object automatically controls a frequency of the pulse signals. That is, if the length is short, it is measured by a high frequency of pulse signal, and by a low frequency of pulse signals if the length is long. The pulse tester can recognize a defect state of a liquid pipe by grasping the state of a cable according to waveform of a reflected pulse. Namely, it is available to grasp wire breaking (open), wire entanglement(short), submerging, and cross talk. Therefore, it is possible to grasp a defect state by waveform of reflected pulse signals and to measure a defect area by a receiving time. In the case of the wire breaking (open), a corresponding position of a liquid pipe is decided as fully damaged, the wire entanglement(short) is decided as construction error. When submerged, it is decided as water leakage in a corresponding position.

The pulse tester(200) periodically generates pulse signals to deliver them, and receives reflected pulse signals. Desirably, a TDR(Time Domain Reflectometer) having a low frequency is used to search the exact position where water leaks. The pulse tester(200) has pulse tester information for identifying the corresponding pulse tester, that is a pulse tester ID and a transmitter(not shown) for transmitting the reflected pulse signal. Desirably, a wireless transmitter for wirelessly transmitting data is installed.

Figure 9:
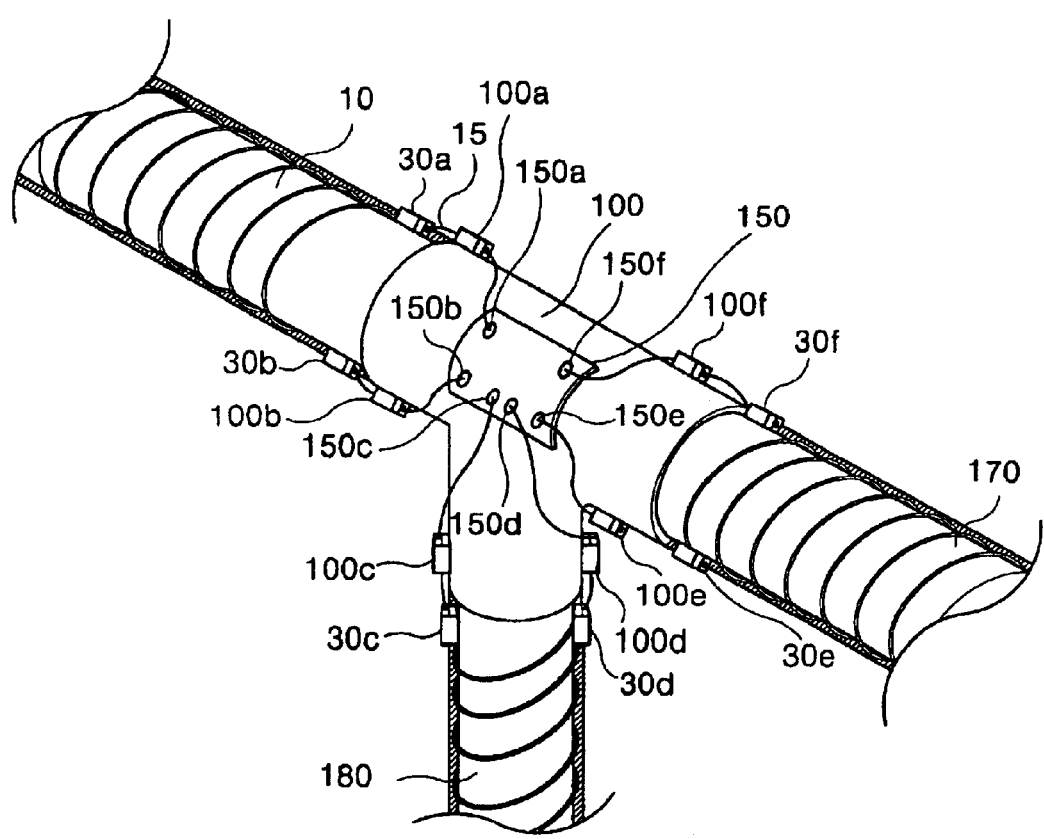
FIG. 9 is a state diagram of representing the state of many liquid pipes being connected.

FIG. 9 is a diagram presenting the state of many liquid pipes being connected, illustrating an embodiment of 3 liquid pipes(10) being connected as T-shaped via routers. Each of the liquid pipes(10, 170, 180) is connected to one another by connection pipes(100), and conducting wires installed in each of the liquid pipes are linked to connecting parts(30a to 30f) formed in the connection pipes, respectively. The connecting parts(30a to 30f) are coupled with connecting parts(100a to 100f) of the connection pipes(100) by connection lines(15), respectively, and the connecting parts(100a to 100f) of the connection pipes(100) are linked to connection points(150a to 150f) of routers(150), respectively. The routers(150) electrically couple conducting wires of each liquid pipe or disconnect the connected state by a control signal transmitted from outside.

There are various types of connection pipes according to the number of connected liquid pipes or connected states. For instance, when coupling two liquid pipes, a single line-shaped connection pipe or a connection pipe with a square shape without two lines is used. When coupling three liquid pipes, a 'T'-shaped connection pipe is used, and '+'-shaped connection pipe is used while coupling 4 liquid pipes.

The routers(150) in accordance with the present invention correspond to the generation of 'T'-shaped or '+'-shaped connecting section while forming a liquid pipe network, connect conducting wires of a selected liquid pipe among liquid pipes connected by the connection pipes(100), that is the liquid pipe for detecting water leakage by delivering pulse signals. In another words, when more than 3 liquid pipes are connected, it can set/change a transmission path of the pulse signals. The operation of the routers are controlled by a control signal transmitted from outside, and the routers carry out a pulse test by configuring a partial network in a water leakage detecting area or a position where water leakage is doubted on the liquid pipe network. The routers (150) are designed by ASIC that does not attenuate signals of the pulse tester, and installed in the connection pipes(100) or continue to perform a network test by being fixed in one path even when it malfunctions. The routers(150) in accordance with the present invention comprise contact points (150a to 150f) connected with conducting wires of each liquid pipe and a receiver(not shown) for wirelessly receiving a control signal from a central monitoring system. The routers(150) electrically connect the conducting wires of each liquid pipe by electrically contacting the connection points to one another according to the control signal received through the receiver.

Figure 10:
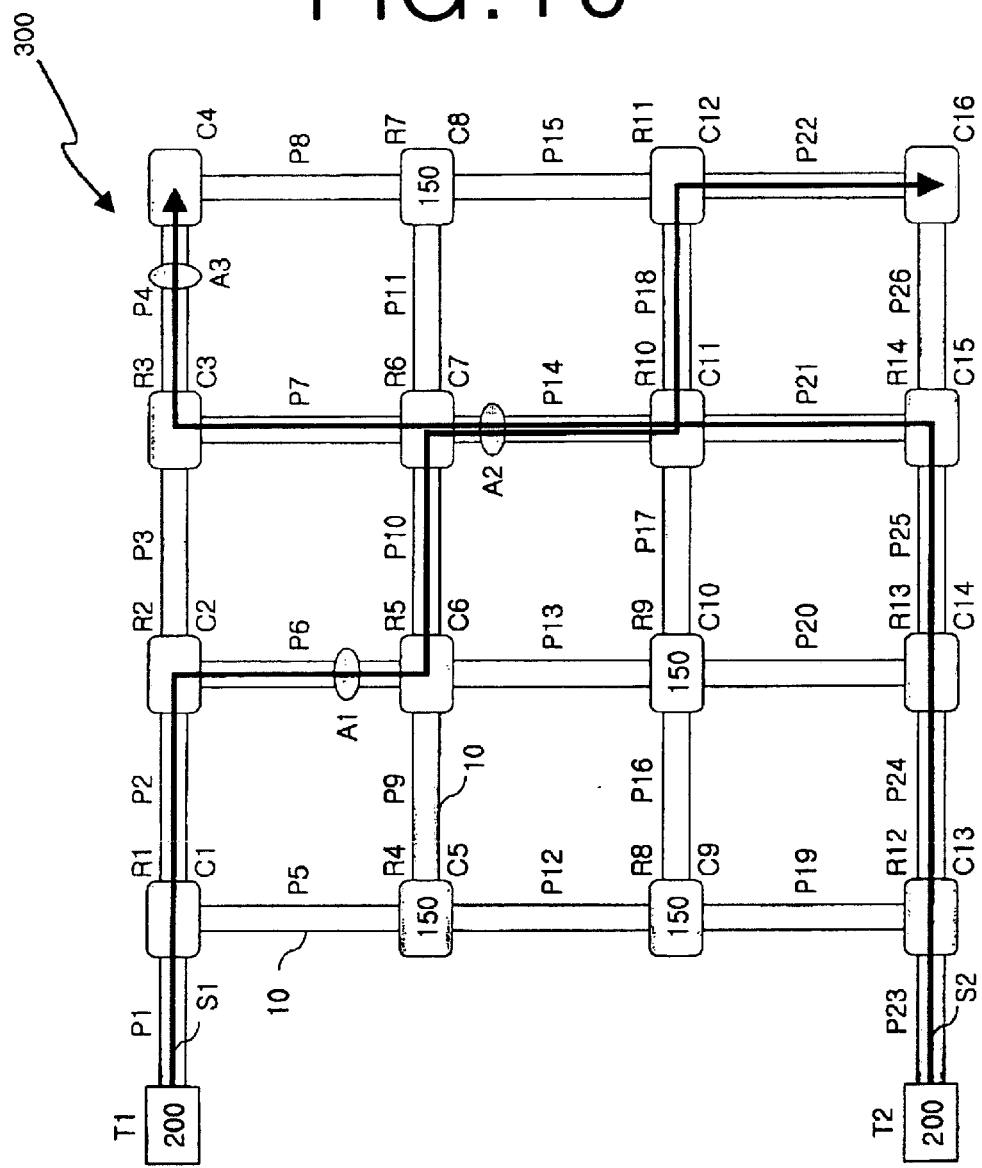
FIG. 10 is an example diagram of comprising a liquid pipe network.

FIG. 10 is an example format diagram of a liquid pipe network. Like shown in FIG. 10, the liquid pipe network (300) freely sets a connection path of conducting wires by controlling routers(150) with a control signal of a central monitoring system, and detects whether or not each liquid pipe is damaged by delivering pulse signals to the set path through a pulse tester(200).

When the router control signal for setting a path to liquid pipes 'P1:P2:P6:P10:P14:P18:P22' is set from the central monitoring system, routers 'R1, R2, R5, R6, R10 and R11' operate to electrically connect the conducting wires of each liquid pipe. More specifically, control signals including router IDs and an ID of a liquid pipe to be linked are transmitted to every router. For instance, control signals such as R1:P1:P2, R2:P2:P6, R5:P6:P10, R6:P10:P14, R10:P14:P18 and R11:P18:P22 are transmitted.

When the path is set by the routers, a pulse signal(S1) is delivered to a path where a pulse tester(T1) is set, and the delivered pulse signal is transmitted to the end of the path unless a liquid pipe is damaged. Then, the pulse signal is reflected from the end to be received in the pulse tester(T1). The pulse tester(T1) transmits an ID of the pulse tester with the received pulse signal to the central monitoring system, and the central monitoring system applies the reflected pulse signal to the set path to analyze it, thereby calculating whether or not the liquid pipe is damaged or a damaged area. That is, it extracts the set path through the ID of the pulse tester(T1), extracting information on the liquid pipe and the conducting wires about the set path from a pipe network database, and applies waveform and receiving time of the reflected pulse signal to the extracted information to analyze the waveform and the receiving time. FIG. 10 shows that it is possible to calculate a damaged type and a damaged area at A1 and A2 by analyzing the waveform and the receiving time of the reflected pulse signal.

Similarly, when router control signals 'R12:P23:P24, R13:P24:P25, R14:P25:P21, R10:P21:P14, R6:P14:P7 and R3:P7:P4' are transmitted to set a path to liquid pipes 'P23:P24:P25:P21:P14:P7:P4', each router sets a path and a pulse tester(T2) delivers a pulse signal(S2) to the set path as well as receiving the reflected pulse signal to transmit it to the central monitoring system. The central monitoring system analyzes the reflected pulse signal by applying it to the set path, and calculates a damaged type and a damaged area of A2 and A3.

Figure 11:
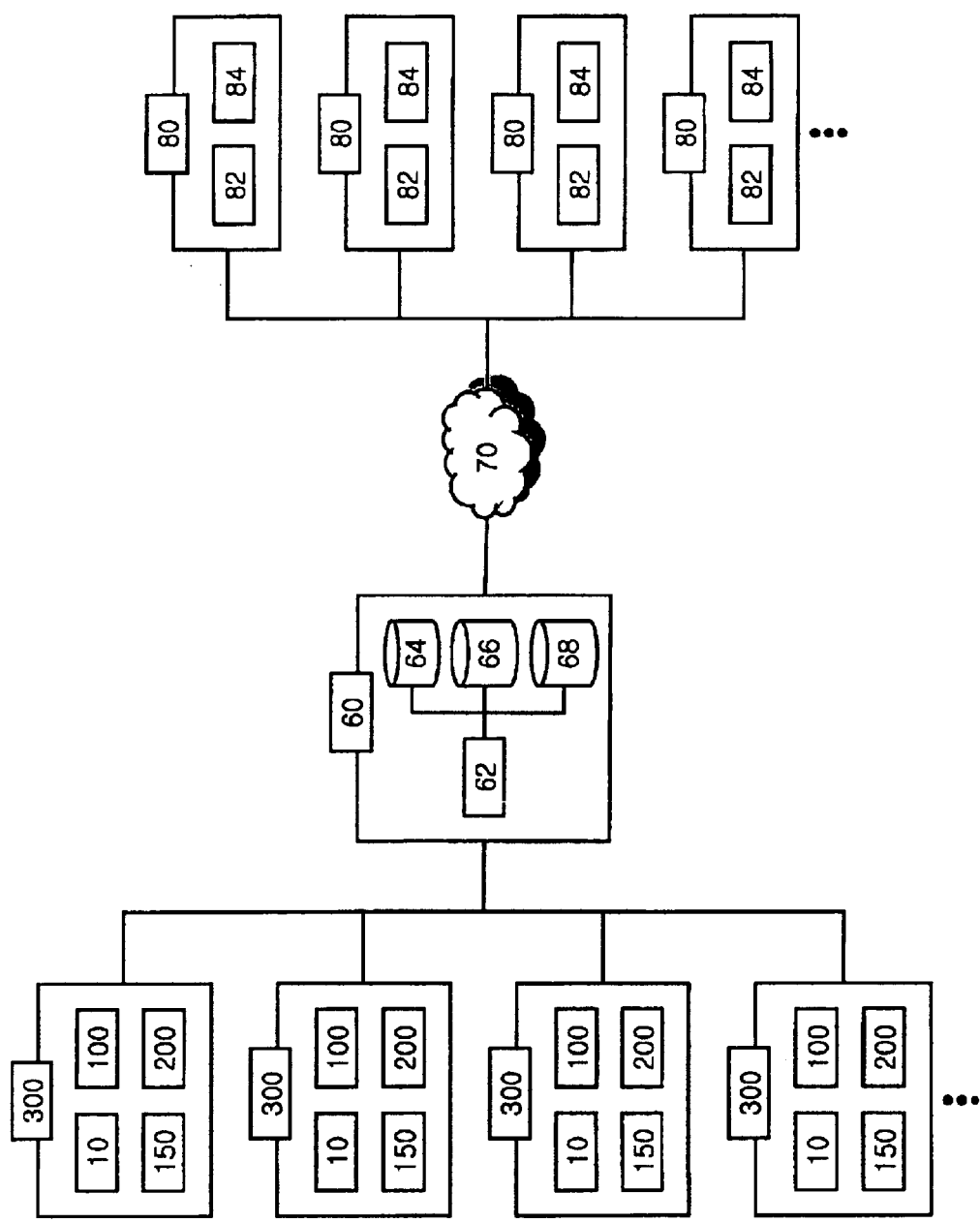
FIG. 11 is a format diagram of a water leakage detecting system for liquid pipes.

FIG. 11 is a format diagram of a water leakage detecting system for liquid pipes. The water leakage detecting system for liquid pipes in accordance with the present invention comprises a liquid pipe network(300), a central monitoring system(60), and a manager client(80). The liquid pipe network(300) comprises as follows. Many liquid pipes(10) inserted or fixed with more than one conducting wires are connected by connection pipes(100), configuring a network. The conducting wires of each liquid pipe(10) are electrically connected by setting a path with routers(150). More than one pulse testers(200) deliver pulse signals to the set path, and transmit reflected pulse signals by receiving them. The central monitoring system(60) recognizes the state of the liquid pipes(11) by receiving and analyzing the reflected pulse signals, and provides a monitoring environment by displaying information of the liquid pipe network(300). The manager client(80) manages the Internet or wire/wireless communication network(70) and the liquid pipe network (300).

The central monitoring system(60) in accordance with the present invention transmits a router control signal, knowing the state of each liquid pipe by receiving a pulse tester ID and a reflected pulse signal to recognize the state of conducting wires, and displays information of the liquid pipe network(300), informing the manager client(80) of an alarming message when a predetermined liquid pipe malfunctions. In addition, the central monitoring system(60) provides an integrated management environment such as filtration plant management and various remote inspection as well as detection of conduit line water leakage, if a liquid pipe network is waterworks facility.

The central monitoring system(60) has a central monitoring server(62), a manager database(64), a pipe network database(66), and geographic information database(68).

The central monitoring server(62) in accordance with the present invention transmits a router control signal for setting a path of conducting wires, where pulse signals are transmitted automatically or under control of the manager client (80), to routers(150). The server receives reflected pulse signals for the pulse signals delivered through the path set from the pulse tester(200) and the pulse tester ID, and recognizes the state of each liquid pipe for the set path of the conducting wires by analyzing the reflected pulse signals. The reflected pulse signals include waveform and receiving time of the reflected pulse signals, thereby deciding whether or not each conducting wire is damaged on the set path by analyzing the reflected pulse signals, calculating a position of a damaged conducting wire, as well as calculating a damaged area of a liquid pipe from the calculated position of the damaged conducting wire.

When analyzing the reflected pulse signals, a receiving time and waveform of a reflected pulse signal for a normal liquid pipe are compared with the received reflected pulse signals. When installing a liquid pipe network, pulse signals are delivered to conducting wires of connected liquid pipes, to obtain and calculate data(hereinafter, 'initial location data') including a normal receiving time and waveform of each liquid pipe, length of conducting wires, and the length of liquid pipes calculated from the length of the conducting wires. Then, the data is stored in the pipe network database. In addition, it periodically calibrates data(hereinafter, 'compensating location data') used as reference of a normal state in comparison with analyzed result when water leakage is detected, to prepare for data calculated through reflected pulse signals generated when transmission speed of the pulse signals is changed due to temperature changes while operating the liquid pipe network. The compensating location data includes data same as the initial location data. The initial location data and the compensating location data are obtained, calculated, and stored every liquid pipe constituting the liquid pipe network. When compensating the compensating location data, more than one liquid pipes are selected to deliver/receive pulse signals, in order to obtain/calculate a normal receiving time, waveform, the length of conducting wires, and the length of liquid pipes, thereby updating the obtained/calculated information in a pipe network database. More specifically, the compensating location data for the entire liquid pipes is compensated: by selecting a predetermined liquid pipe(first liquid pipe) of liquid pipe networks to calibrate the compensating location data; calculating a changing rate of the first liquid pipe; extracting compensating location data of a liquid pipe(second liquid pipe) that is not selected from the pipe network database; and compensating it by applying the changing rate to the extracted data. Therefore, it is possible to obtain a more exact, precise analysis result. The method of calculating and compensating the compensating location data will be explained in detail as follows.

Besides, the central monitoring server(62) displays present state information of the liquid pipe network(300) and each liquid pipe(10). When displaying them, a predetermined display unit or a predetermined web page is used for displaying. That is, when the manager client(80) controls and observes the central monitoring server(62) in a local place, it is displayed through a monitoring unit. If connecting to wire/wireless communication networks or the Internet from a remote place, it is displayed in the web page. Of course, this server system can be implemented as central processing unit and PC or control logic composed of hardware or software, when deemed necessary.

Also, the central monitoring server(62) generates an alarming sound when the liquid pipe(10) is damaged or changes a color of the damaged liquid pipe(10), then displays a predetermined icon, when displaying the stage of the liquid pipe network(300), thereby enabling the manager client to easily identify the state.

And, the central monitoring server(62) transmits an alarming message to the manager client(80) through e-mail or SMS(Short Message Service), when the liquid pipe(10) is damaged.

The manager database(64) in accordance with the present invention stores information of each manager client(80). The information of the manager clients includes personal information, duty areas, and authentication information of the manager clients(80). The authentication information authenticates manager clients remotely or locally accessing to the manager database.

The pipe network database(66) in accordance with the present invention stores information of the liquid pipes(10), the connection pipes(100), the routers(150), and the pulse tester(200) constituting the liquid pipe network(300). That is, it stores each ID, kinds of the liquid pipes and the connection pipes, kinds and length of conducting wires inserted to the liquid pipes, length of the liquid pipes, ID of the liquid pipes connected through the connection pipes, damaged fact of the liquid pipes or the connection pipes, damaged type and damaged area, initial location data and compensating location data of each liquid pipe. Desirably, an error of the database is calibrated by installing a calibrator at regular intervals for compensating an error of length of conducting wires and liquid pipes in accordance with temperature. The initial location data and the compensating location data are from liquid pipes where no damage is generated, and desirably a frequency of a delivered pulse signal is stored as well. Therefore, the central monitoring system comparatively analyzes reflected pulse signals by applying an analyzed result to the compensating location data, thereby calculating whether or not each liquid pipe is damaged, a damaged type and a damaged area.

The geographic information database(68) in accordance with the present invention displays present state information of the liquid pipe network(300) or recovers a damaged liquid pipe(10), and stores laid position and each connected type of each liquid pipe(10), the connection pipes(100), the routers (150), and the pulse tester(200). In addition, it can store the length of each liquid pipe and conducting wires installed in the liquid pipes. Thus, it can calculate the length of some selected liquid pipes and the length of conducting wires among liquid pipe networks. It can also carry out a recovering work by exactly recognizing a laid position of the damaged liquid pipe(10).

The pipe network database(66) and the geographic information database(68) are configured in reference to related information. For instance, when displaying the state of a liquid pipe network, the connection type of the liquid pipes, routers, and the pulse tester is extracted from the geographic information database(68), and detailed information is extracted from the pipe network database(66) by using each ID. Also, when recovering a damaged liquid pipe, an ID of the damaged liquid pipe is extracted from the pipe network database(66) to extract a laid position of the corresponding liquid pipe from the geographic information database(68).

The manager client(80) in accordance with the present invention manages the liquid pipe network(300), and performs maintenance of each facility including the damaged liquid pipe(10). Thus, a present state of each liquid pipe(10) is inspected through state information of the liquid pipe network(300) displayed in a monitoring unit or web page provided from the central monitoring system, and the damaged liquid pipe(10) is recovered. If an alarming message is received from the central monitoring system(60), it inspects the state of the corresponding liquid pipes(10) to recover them.

The manager client(80) in accordance with the present invention has: a manager terminal(82) accessing to the central monitoring system(60) through wire/wireless communication networks(70) or the Internet; and an authenticator(84) for authenticating the manager client.

The manager terminal(82) in accordance with the present invention has access to the central monitoring system(60) or the web page provided from the central monitoring system through the Internet or wire/wireless communication networks(70), and receives present state information of the liquid pipe network(300) to display it, then transmits data inputted by the manager client(80) to the central monitoring system(60). As for the manager terminal(82), there are PC, PDA, portable phone with wireless Internet, and IMT 2000 terminal.

The authenticator(84) in accordance with the present invention provides security of liquid pipe network management by authenticating the manager client. To authenticate the manager client(80), a password is used, and when the manager client has access to the central monitoring system (60) from a remote place, another authenticator can authenticate the manager client for a high degree of security. The authenticator(84) can be implemented as smart card or fingerprint-recognizing terminal.

Figure 12:
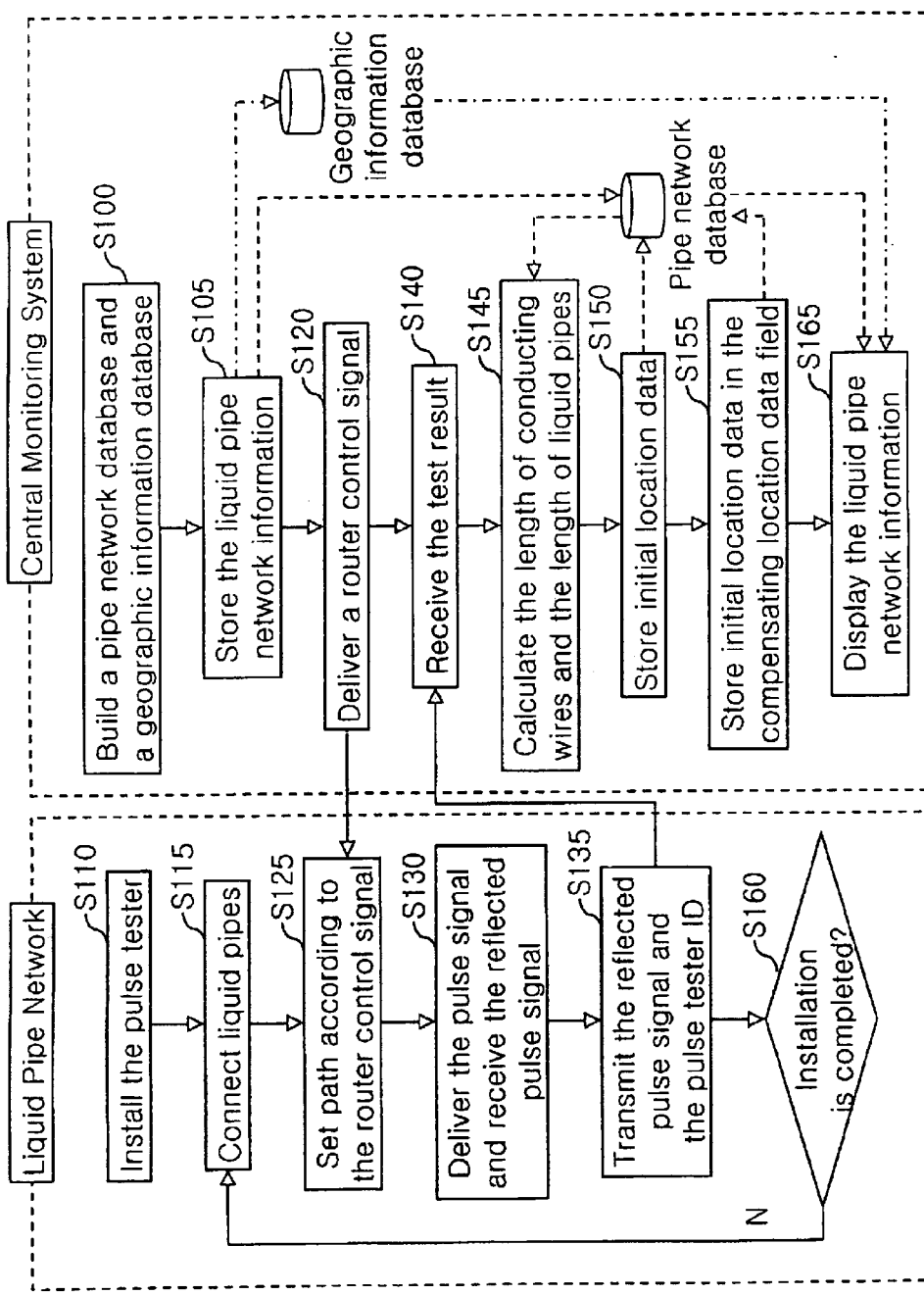
FIG. 12 is a flow chart of illustrating installation of a liquid pipe network and a storing process of initial position data.

FIG. 12 is a flow of installing a liquid pipe network and storing initial location data. Referring to FIG. 12, the installation of the liquid pipe network and the storing process of the initial location data flow as follows.

A central monitoring system(60) builds a pipe network database(66) and a geographic information database(68) (S100), and stores information of a liquid pipe network(300) (S105). Liquid pipe network information includes information on each liquid pipe(10) to be installed in the liquid pipe network, connection pipes(100), routers(150), and a pulse tester(200) as well as laid position. Desirably, substantially installed contents are stored while installing the liquid pipe network. For instance, when cutting a liquid pipe, the length of the cut liquid pipe is stored instead of the length of the entire liquid pipes. A manager client taking in charge of the installation of the liquid pipe network previously inputs each of data, or inputs them by data transmission in the field. In addition, if the liquid pipe network is built differently from contents stored in a database, the corresponding data will be updated later.

The manager client(80) installs the pulse tester(200) comprising the liquid pipe network(300)(S110), and installs the routers(150)(S115). The pulse tester is installed on the end of the network. The process of installing the liquid pipe network is done by repeating the process of installing each liquid pipe and calculating the length of conducting wires of the installed liquid pipes and the length of the liquid pipes.

The central monitoring system(60) delivers a control signal for turning on/off the connected state of the conducting wires of each liquid pipe installed on each router, to sense the installed state of each liquid pipe (S120), and the routers(150) turn on/off or short the electrically connected state of the conducting wires of each liquid pipe according to a received router control signal(S125). The pulse tester (200) automatically delivers pulse signals to the conducting wires of the installed liquid pipes at regular basis, and transmits received reflected pulse signals to the central monitoring system(60), thereby sensing whether or not each liquid pipe is installed by receiving and analyzing the reflected pulse signals. And, since the central monitoring system can wirelessly control the routers from a remote place by using the router control signal, a path is set by turning on/off or shorting the router(150). It can sense liquid pipes branched into 'T' shape or '+' shape by receiving and analyzing reflected pulse signals for the set path.

The pulse tester(200) delivers pulse signals to the path set by the routers(150), receives the reflected pulse signals in a shorted position(S130), and transmits the received reflected pulse signals and an ID of the pulse tester to the central monitoring system(60)(S135). Desirably, it transmits frequency of the pulse signals. The pulse tester automatically delivers the pulse signals and transmits the received reflected pulse signals. Therefore, when a liquid pipe is additionally connected and each conducting wire of the connected liquid pipe is coupled by the routers, signals delivered from the pulse tester are transmitted through the conducting wires of the connected liquid pipe, and the reflected pulse signals are received.

The central monitoring system(60) receives the reflected pulse signals and an ID of the pulse tester(S140), sensing a newly installed liquid pipe through received data, and calculates the length of conducting wires of the corresponding liquid pipe to calculate the length of the liquid pipe by using the calculated length of the conducting wires(S145). When a liquid pipe is additionally installed, a receiving time of the reflected pulse signals is increased, and the central monitoring system senses the additional installation of the liquid pipe by analyzing the received reflected pulse signals, calculating the length of conducting wires of the additionally installed liquid pipe and the length of the liquid pipe.

For instance, when a liquid pipe network is built as shown in FIG. 10, and if a liquid pipe 'P1' is installed only and a router 'R1' shorts each conducting wire of the P1, the central monitoring system receives a reflected pulse signal for the P1. Thus, the central monitoring system senses the installation of the P1, calculating the length of conducting wires installed in the P1 through a receiving time of the reflected pulse signals, and calculates the length of the P1 through the calculated length of the conducting wires.

And, when the liquid pipes 'P1' and 'P2' are installed, the router 'R1' electrically connects conducting wires of the P1 and P2, and if a router 'R2' shorts the conducting wires of the P2, the central monitoring system receives reflected pulse signals of the P1 and the P2. The central monitoring system loads a receiving time, length of the conducting wires, length of the liquid pipes of the reflected pulse signals of the P1 from the pipe network database as well as connected types of each liquid pipe connected to the P1, and comparatively analyzes the received reflected pulse signals. The receiving time of the received reflected pulse signals is bigger than the receiving time of the reflected pulse signals for the P1, and a router control signal for setting a path in the P2 horizontally connected to the P1 is delivered to the router 'R1', thus sensing that the P2 is installed. And, through the receiving time of the received reflected pulse signals, the length of the entire conducting wires of the connected P1 and the P2 is calculated, and the length of the conducting wires is subtracted from the calculated result, thereby calculating the length of the conducting wires of the P2. In addition, the length of the liquid pipe 'P2' is calculated from the calculated length of the conducting wires. So, the P2 is calculated, including the length of a connection pipe 'C1'. In the same manner, when the liquid pipes 'P1' to 'P5' are installed, the router 'R1' electrically connects conducting wires of the P1 and the P5, and a router 'R4' shorts conducting wires of the P5. As a result, the central monitoring system receives reflected pulse signals for the P1 and the P5 to sense the installation of the P5, and calculates the length of the entire conducting wires through a receiving time of the received reflected pulse signals, then subtracts the length of the conducting wires of the P1 from the calculated result, thereby calculating the length of the conducting wires of the P5 as well as the length of the liquid pipe 'P5'. The length of the P5 includes the length of the connection pipe 'C1'. If there is no router between the pipes, the pipe length can be calculated by artificially shorting a connected part or the length of the liquid pipes is calculated in the state of the connected part being opened(original state). When detecting water leakage of a liquid pipe network or displaying the state of the liquid pipe network, an exact damaged area can be calculated, therefore it is unnecessary to distinguish connection pipes. So, the part of the connection pipes is decided same as common liquid pipes when calculating a damaged area. If waveform of the received reflected pulse signals is different from a normal waveform, it can be decided that a measured liquid pipe is damaged, so it is necessary to transmit an alarming message to the manager client(80) for changing the damaged one.

When building it in the actual site, a builder builds a pipe network DB through pulse tester monitoring as connecting pipes with connection holes. Namely, contact parts of connection holes without routers are artificially shorted like mentioned above or maintain the open state, and it is possible to build an exact DB during construction as setting a proper path for connection holes with routers.

The central monitoring system(60) stores waveform and receiving time of reflected pulse signals received, calculated length of conducting wires, and length of liquid pipes at every liquid pipe in the field of initial location data of the pipe network database(66)(S150). When receiving reflected pulse signals for the path of many liquid pipes, a receiving time can be stored by calculating data on the corresponding liquid pipes. That is, reflected pulse signals of the liquid pipes 'P1' and 'P2' or 'P1' and 'P5' are received in the above example, receiving time of the P2 or the P5 can be calculated.

The central monitoring system(60) stores initial location data in the field of compensating location data of the pipe network database(66)(S155). The compensating location data stored in each item of the field of the compensating location data is calibrated by periodically measuring it while operating a system, inputting initial location data as an initial value. Each item of the compensating location data is the same as that of the initial location data, therefore the initial location data is inputted in each field of the corresponding compensating location data.

The process of connecting and measuring each liquid pipe(S115 to S155) is repeated until an entire liquid pipe network(50) is built(S160).

The central monitoring system(60) displays present state information of the liquid pipe network(S165). If a manager client is in a local area, it is displayed through a display unit, and if the manager client remotely has access to the system, it is displayed on a web page. Also, present state information of the liquid pipe network is displayed in reference to a geographic information database(68). That is, it is displayed by extracting laid positions of liquid pipes of the liquid pipe network and connection pipes as well as connected types from the geographic information database; and extracting detailed information of the liquid pipes and the connection pipes from the pipe network database(66) by using IDs of the extracted liquid pipes and the connection pipes. Desirably, the state of each liquid pipe of the liquid pipe network is presented as graphics, and a manager client displays a defect-generated liquid pipe to easily identify it.

Figure 13A:
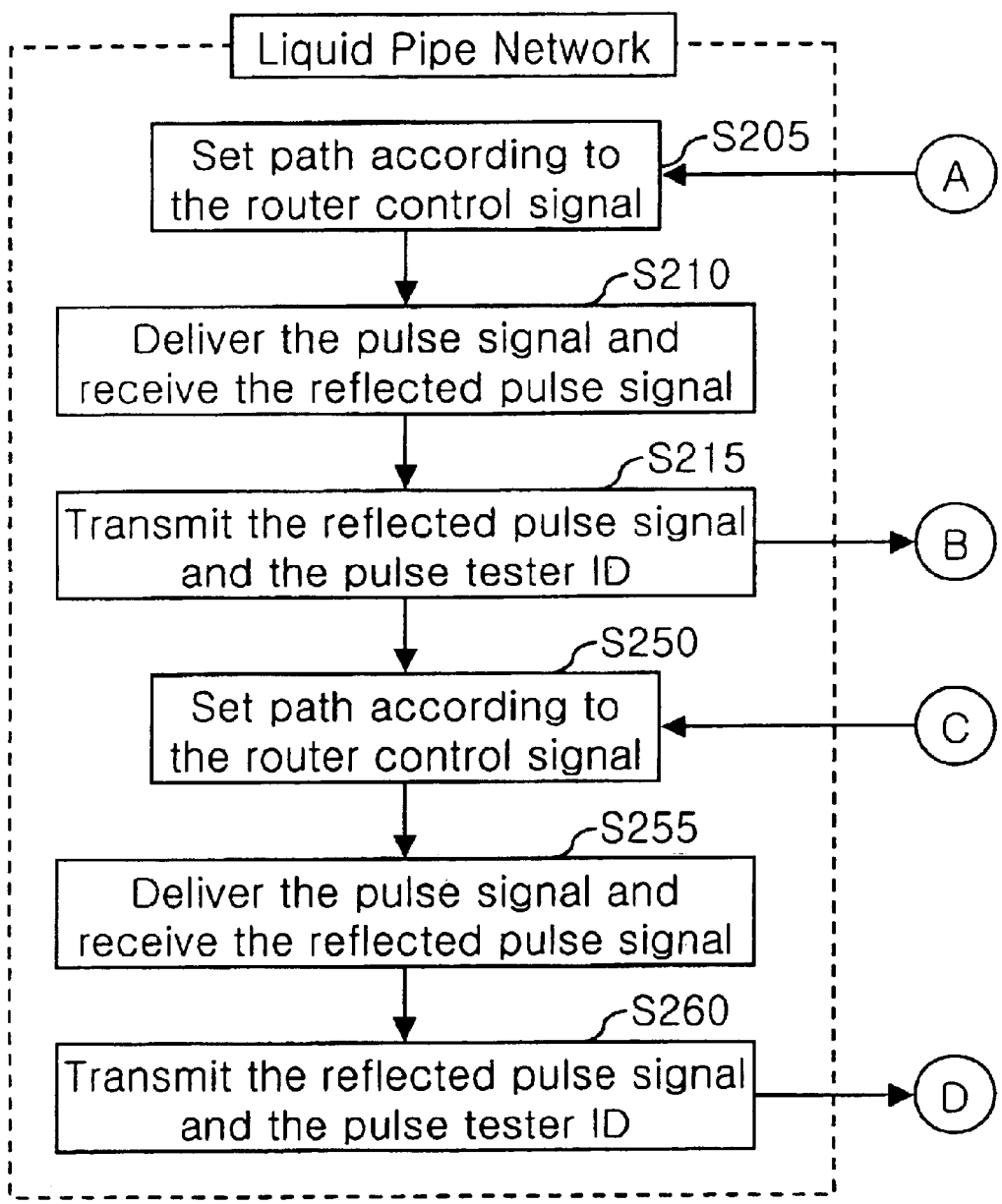
FIG. 13 is a flow chart of illustrating a compensating process of compensation position data and a water leakage detecting process.
Figure 13B:
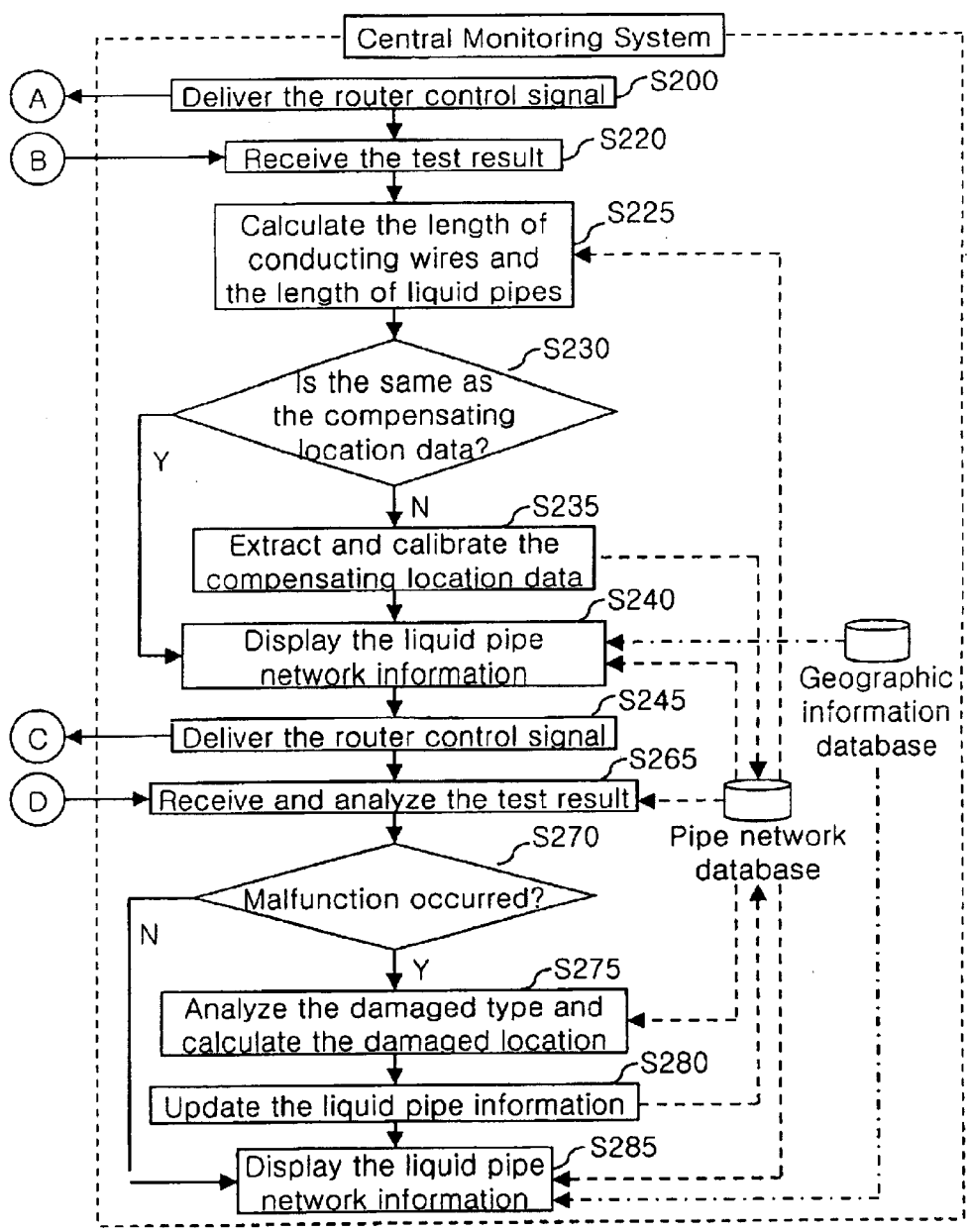

FIG. 13 is a flow chart of calibrating compensating location data and detecting water leakage. Referring to FIGS. 13a and 13b, the process of calibrating the compensating location data and detecting water leakage is as follows.

A central monitoring system(60) delivers a router control signal for setting a pulse signal transmission path in a liquid pipe network, to calibrate the compensating location data (S200). Through the set path, pulse signals are delivered to calibrate the compensating location data, and more than one liquid pipes connected to a pulse tester are selected. The path is set and the router control signal is delivered by selection of a manager client(80), or it can automatically occur on regular basis. When the path is automatically set, a control signal for a preset path is periodically transmitted or the path is automatically set through a predetermined algorithm (hereinafter, 'path setting algorithm'). A router control signal includes router IDs and IDs of liquid pipes contained in the path.

Routers(150) receive a router control signal, and sets a path according to the control signal(S205). Each router receives the router control signal, and connects each conducting wire installed in selected liquid pipes according to the received control signal, thereby setting the path and shorting conducting wires installed in liquid pipes located in the opposite side of a path connected with a pulse tester among the selected liquid pipes. For instance, when the path is set in a liquid pipe 'P1' and 'P2' in the liquid pipe network, pulse signals are transmitted toward the P2 from the P1, therefore a router 'R1' electrically connects conducting wires of the P1 and the P2, and a router 'R2' shorts conducting wires of the end of the P2. As a result, the pulse signals are reflected from the shorted position, received to the pulse tester.

The pulse tester(200) delivers the pulse signals to the set path and receives reflected pulse signals(S210), transmitting the received reflected pulse signals and an ID of the pulse tester(S215). The pulse signals of the pulse tester are automatically delivered as well as the reflected pulse signals and the ID of the pulse tester are automatically transmitted, instead of being controlled by the central monitoring system. The pulse tester automatically delivers the pulse signals on regular basis, and transmits the reflected pulse signals and the ID of the pulse tester to the central monitoring system. Thus, when the path is set by the routers, the pulse signals delivered from the pulse tester are transmitted through the set path, and reflected pulse signals are obtained only for the set path.

The central monitoring system(60) receives the reflected pulse signals and the ID of the pulse tester(S220), and calculates the length of conducting wires and the length of liquid pipes through received data(S225).

The central monitoring system(60) extracts compensating location data of each liquid pipe included in the set path from a pipe network database(66), and decides whether the calculated length of the conducting wires and the liquid pipes is the same as the extracted length of the compensating location data and the liquid pipes(S230). That is, with the received ID of the pulse tester, IDs of the liquid pipes included in the set path are extracted, and with the extracted IDs of the liquid pipes, the compensating location data of each liquid pipe is extracted to be compared with the calculated result. When the liquid pipe network is built like FIG. 10, and if a liquid pipe 'P1' is measured only, the length of conducting wires of the P1 and the location data for the P1 is extracted for comparison. In addition, when measured by setting a path in the liquid pipes 'P1' and 'P2', the length of conducting wires and the length of liquid pipes of the P1 to P2 are calculated and compared with the calculated result by extracting compensating location data of the P1 and P2. More specifically, the length of conducting wires and the length of liquid pipes of the compensating location data of the P1 and the P2 are added up, and the added result is compared with the calculated result. At this time, it is possible to compare them with only the length of the liquid pipes. Also, it can compare a receiving time of reflected pulse signals with a receiving time of compensating location data. If the calculated result is the same as the length of the conducting wires of the compensating location data and the length of the liquid pipes, it can be decided as transmission speed of the pulse signals is the same before calibrating the compensating location data and after measuring it, thereby determining there is no temperature change. So, it is possible to decide whether peripheral environments change through this comparison. The waveform of the received reflected pulse signals is different from waveform of the compensating location data, the conducting wires are decided as damaged, determining whether the liquid pipes are damaged.

If the calculated result is different from the compensating location data in the comparison result of the step 'S230', it means that transmission speed of the pulse signals changes due to temperature changes, therefore the compensating location data is calibrated through received data(S235). That is, compensating location data of selected liquid pipes is calibrated, and compensating location data of the rest liquid pipes is calibrated by using the calibrated data. More specifically, the length of conducting wires of liquid pipes included in the set path is calculated by using the reflected pulse signals, and the length of the liquid pipes is calculated through the calculated length of the conducting wires. And, a changing rate is extracted by comparing the calculated result with the compensating location data of the corresponding liquid pipes, then compensating location data of the rest liquid pipes is extracted from the pipe network database, to apply the calculated changing rate. As a result, the length of the conducting wires and the length of the liquid pipes are calculated, and the calculated data is updated in each field. Through comparison with initial location data, the changing rate, the length of the conducting wires, and the length of the liquid pipes can be calculated. Therefore, it is possible to obtain compensating location data reflected by a transmission speed of a present pulse signal.

The central monitoring system(60) updates present state information of the liquid pipe network(300), and displays it(S240).

The central monitoring system(60) delivers a router control signal for setting a path to carry out water leakage detection among liquid pipe networks(300)(S245). The set path detects whether or not water leaks in each liquid pipe by using pulse selection of a manager client(80), or can be automatically carried out by a path setting algorithm. The router control signal includes router IDs and IDs of liquid pipes contained in the path.

The routers(150) receive the router control signal, and set a path according to a control signal(S250). Each router receives the router control signal, and connects each conducting wire installed in selected liquid pipes according to the received control signal, thereby setting the path and shorting conducting wires of liquid pipes located at the end of the set path.

The pulse tester(200) delivers pulse signals to the set path, and receives reflected pulse signals(S255).

The pulse tester(200) transmits the received reflected pulse signals and an ID of the pulse tester(S260).

The central monitoring system(60) receives the reflected pulse signals and the ID of the pulse tester, and analyzes the reflected pulse signals in reference to a pipe network database(66)(S265), to decide whether or not liquid pipes malfunction(S270). That is, with the received ID of the pulse tester, IDs of liquid pipes included in the set path are extracted, and with the extracted IDs of the liquid pipes, compensating location data of each liquid pipe is extracted. Then, it is decided whether or not the liquid pipes are damaged by comparatively analyzing waveform of normal reflected pulse signals of the compensating location data and waveform of the received reflected pulse signals.

If any malfunction occurs in the step 'S270', that is, malfunction occurs in the waveform of the reflected pulse signals, it calculates a damaged type and a damaged area (S275). The damaged area is calculated with a position of a liquid pipe.

The central monitoring system(60) stores the calculated damaged type and the damaged area in the pipe network database(66), and updates information on the liquid pipes (S280).

The central monitoring system(60) updates a display screen of present state information of the liquid pipe network(S285). In addition, the central monitoring system transmits an alarming message to a corresponding manager client(80), and the manager client grasps a damaged liquid pipe through the display screen or the alarming message, and recovers it.

Figure 14A:
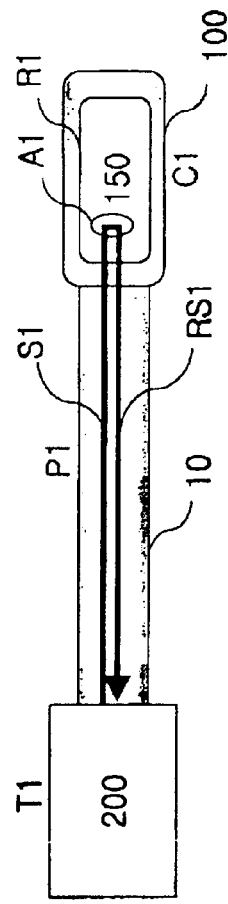
FIG. 14 is an example diagram of illustrating a data compensation of a water leakage detecting system of a liquid pipe.
Figure 14B:
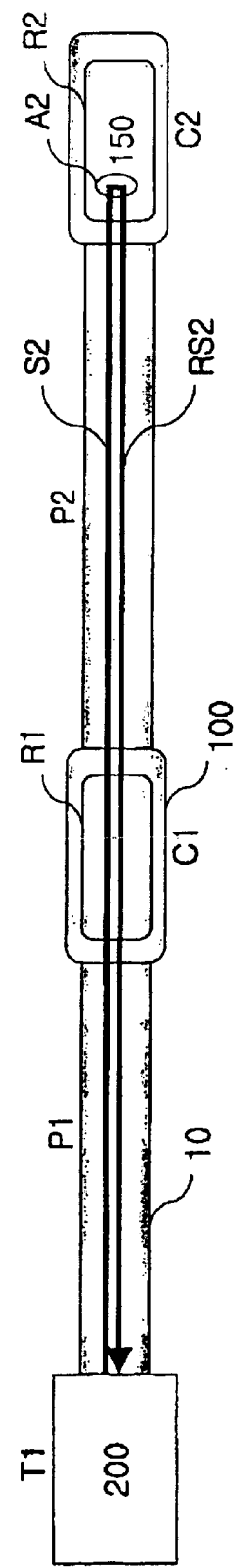
Figure 14C:
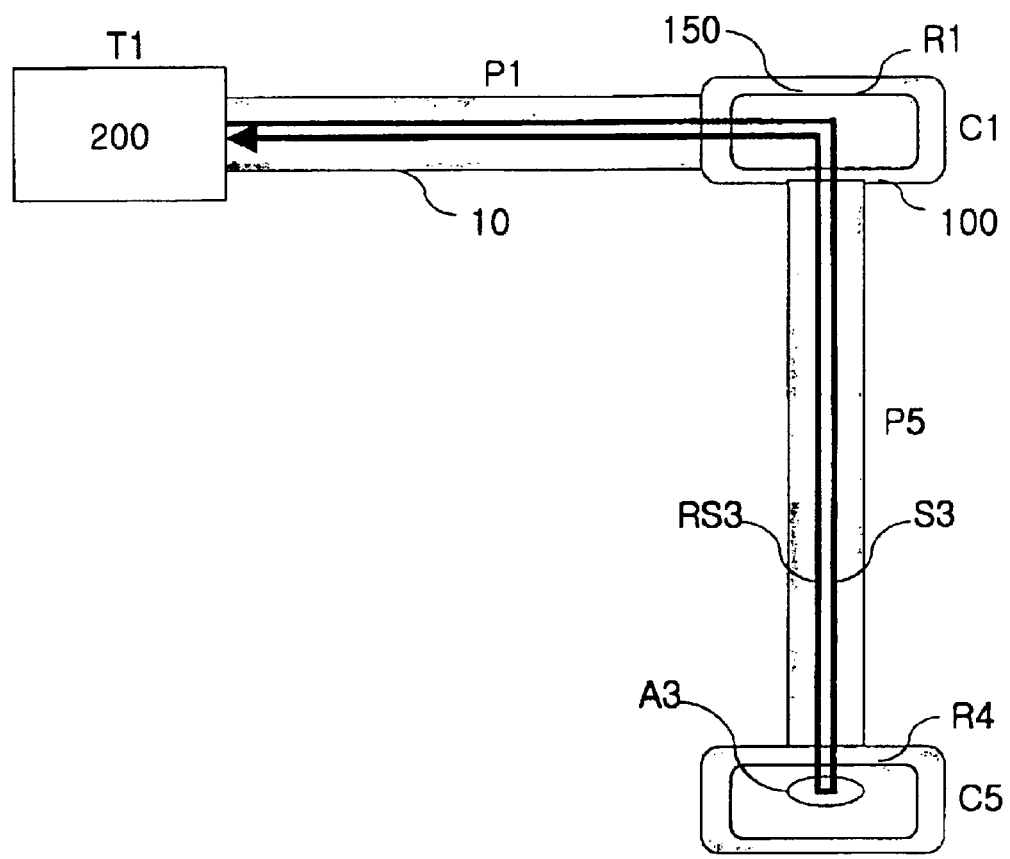

FIG. 14 is an example diagram of a water leakage detecting system for liquid pipes, and FIG. 14a is an example diagram of calibrating data by testing one liquid pipe. FIG. 14b and 14c are example diagrams of calibrating data by testing two selected liquid pipes. Like shown in FIG. 14a to 14c, the water leakage detecting system for liquid pipes periodically selects and tests more than one liquid pipes while operating a liquid pipe network, and updates compensating location data stored in a pipe network database through the tested result. Desirably, it selects Each of them is explained as follows.

Referring to FIG. 14a, a router 'R1' shorts conducting wires installed in P1 by a control signal transmitted from a central monitoring system. If a pulse signal is delivered from a pulse tester(T1), the delivered pulse signal(S1) is reflected from a shorted position(A1), and a reflected pulse signal (RS1) is received to the pulse tester. When the pulse tester transmits an ID of the pulse tester and the reflected pulse signal to the central monitoring system, the central monitoring system calculates the length of the conducting wires of the P1 and the length of liquid pipes through received data, and extracts information on the corresponding liquid pipe(P1) from the pipe network database, to compare the calculated result with the compensating location data. The central monitoring system can compare a receiving time of the received reflected pulse signal with a receiving time of the compensating location data. The length of the conducting wires is calculated through the receiving time of the reflected pulse signal, therefore if the two receiving times are the same, it means a transmission speed of the pulse signal is equal. So, the pipe network database is not updated. However, if the two receiving times are different, the compensating location data is calibrated.

Referring to FIG. 14b, a router 'R1' electrically connects conducting wires installed in P2 with the conducting wires installed in the P1, and a router 'R2' shorts the installed conducting wires. If a pulse signal(S2) is delivered from a pulse tester(T1), the delivered pulse signal is reflected from a shorted position (A2), and a reflected pulse signal(RS2) is received to the pulse tester. The central monitoring system receives an ID of the pulse tester and the reflected pulse signal from the pulse tester, and calculates the length of conducting wires and the length of liquid pipes from the received data. After that, it extracts compensating location data for the corresponding liquid pipes(P1, P2) from the pipe network database, and compares it with the calculated result. More specifically, the length of the conducting wires of the P1 and the P2 included in the extracted compensating location data is added up with the length of the liquid pipes, and the added result is compared with the calculated result. If the calculated result is different from the added result, compensating location data for each liquid pipe is calibrated.

Referring to FIG. 14c, a router 'R1' electrically connects conducting wires installed in P1 with conducting wires installed in P5, and a router 'R4' shorts the conducting wires installed in the P5. If a pulse signal(S3) is delivered from a pulse tester(T1), the delivered pulse signal is reflected from a shorted position(A3), and a reflected pulse signal(RS3) is received to the pulse tester. A method of calibrating data is the same as the above.

FIG. 15 illustrates a structure of a pipe network database, and FIG. 15a and 15b are liquid pipe information tables, then FIG. 15c is a connection pipe information table, illustrating important fields only. Each of them is applied to the liquid pipe network shown in FIG. 10.

Like shown in FIGS. 15a and 15b, the liquid pipe information tables store information on each liquid pipe and installed conducting wires. The liquid pipe information tables store receiving time of each liquid pipe, initial location data, and compensating location data of the length of conducting wires. Data stored in a liquid pipe length field and a conducting wire length field is inputted before installing the liquid pipe network. Data stored in a receiving time field of an initial location data field, a conducting wire length field, and a liquid pipe length field is measured and calculated while installing the liquid pipe network. In addition, data stored in a receiving time field of compensating location data, a conducting wire length field, and a liquid pipe length field is periodically measured and calibrated while operating the liquid pipe network. The reason why the data stored in the conducting wire length field of the initial location data field and the liquid pipe length field is bigger than the data stored in the conducting wire length field and the liquid pipe length field is because the length of the conducting wires and the length of the liquid pipes of the initial location data include up to the length of connection pipes and the length of conducting wires installed in the connection pipes. And, the compensating location data field is updated by periodically selecting more than one liquid pipes to deliver, receive, and analyze pulse signals.

For instance, if a liquid pipe 'P1' is measured and compensating location data before measurement is the same as the initial location data, it can be known that a receiving time increases by 0.18 second and the length of conducting wires of liquid pipes increases by 1.8 m. Therefore, with a changing rate for the receiving time and the length of conducting wires, +1/50 is calculated, and compensating location data is calibrated by applying it to other liquid pipes.

INDUSTRIAL APPLICABILITY

Like mentioned so far, the present invention can exactly grasp the position of liquid pipes laid underground, calculating an exact location where a liquid pipe is damaged by detecting whether or not water leaks due to the damaged liquid pipe, and can recognize the pipe state of a network composed of more than one liquid pipe at a time.

In other words, a water leakage detecting system and the method thereof in accordance with the present invention have the following effects.

First, when liquid pipes are used in waterworks pipes, it can exactly know whether or not water leaks and a leaking area owing to a damaged waterworks pipe laid underground, thereby preventing water consumption as well as reducing costs and human power for repair and recovery. That is, it can exactly grasp whether or not waterworks pipe malfunctions in a short time to cope with it, thus preventing water consumption and remarkably reducing costs and human power for changing and recovering by exactly recognizing an exact location of a malfunctioning waterworks pipe.

Second, it can prevent damage while carrying liquid pipes, and easily connect/install the liquid pipes or change a damaged liquid pipe by cutting it as necessary length while changing the pipe. And, it is applicable to steel pipes or PE pipes.

Third, it automatically controls delivery of pulse signals through another terminal, and displays information on whether or not water leaks in a liquid pipe or a leaking area, or transmits the information to a central management center, so that the manager can grasp the state of the liquid pipes by the displayed contents of the terminal, coping with the problems. As a result, the cost and human power for managing and recovering the liquid pipes are remarkably reduced.

Finally, when the liquid pipes are used as waterworks pipes, it can uniformly know whether or not water leaks or a leaking area owing to a damaged waterworks pipe as well as laid positions of each waterworks pipe comprising the entire waterworks network, thereby greatly reducing costs and human power for inspecting and recovering the waterworks pipes. That is, it uniformly manages the entire waterworks pipes as grasping whether or not water leaks and a leaking area of waterworks pipes in real time, thus reducing costs and human power for inspecting and recovering the waterworks pipes.

The present invention is described by mainly focusing on liquid pipes, however it goes without saying that the idea of the present invention is not limited to above details and can be applied to the gas pipe transporting gas. And above water pipe is the meaning including the drainpipe, so above description for water pipe can be applied to drainpipes.

Therefore, the invention in its broader aspects is not limited to the specific details, representative herein. Accordingly, various modifications may be made without departing from the spirit or scope of the general inventive concept as defined by the appended claims and their equivalents.

What is claimed is:

1. A liquid pipe network composed of many liquid pipes for detecting water leakage, comprising:

each liquid pipe having outer circumference of a predetermined thickness 't', said outer circumference having an inner surface and an outer surface, and said liquid pipe wherein liquids flow into an inner empty space formed in said inner surface; and at least one pair of conducting wires laid on said outer circumference, wherein the outline of said laid conducting wires is projected in the shape of prominence out of said outer surface, connecting parts being installed in said outer surface far away from a lead-in entrance and an outlet of said liquid pipe, said lead-in entrance where liquids flow in, and said outlet where said liquids flow out, and said connecting parts electrically connecting said conducting wires of neighboring said liquid pipes more easily, an insertion groove being formed in said outer surface of said projected place by said laid conducting wires, and said insertion groove exposing said laid conducting wires, and wherein an adhesive is comprised in a lower part of said connecting parts, said adhesive bonding said connecting parts into said insertion groove, and a connection groove is comprised in a portion of said connecting parts, said connection groove for connecting said connecting parts with said conducting wires.

2. A liquid pipe, network composed of many liquid pipes for detecting water leakage, comprising:

each liquid having outer circumference of a predetermined thickness, said outer circumference having an inner surface and an outer surface, and said liquid pipe wherein liquids flow into an inner empty space formed in said inner surface; and an insertion groove having a predetermined depth for inserting covered conducting wires connected with the neighboring liquid pipe, said insertion groove formed along said outer surface of each liquid pipe.

3. Said liquid pipe network for detecting water leakage of claim 2, wherein each liquid pipe for detecting water leakage further comprises:

at least one pair of covered conducting wires formed in said groove with said predetermined depth, said covered conducting wires maintaining an electrically insulated state with said liquid pipe by electric nonconductors.

4. A water pipe for easily detecting water leakage, said water pipe is formed reciprocally bonding neighboring PE lines as spirally rotating the PE lines formed as line shape, and a section cut said water pipe in the vertical direction of a length direction for said PE lines, said section comprising:

a first PE layer constituting one boundary side;

filling materials filled in said first PE layer, and said filling materials being made of insulators;

one pair of conducting wires inserted between said filling materials as an insulated state; and a second PE layer formed in an outer layer of said first PE layer.

5. Said water pipe of claim 4, wherein a melting point of said second PE layer is lower than a melting point of said first PE layer.

6. A liquid pipe network for easy water leakage detection, said liquid pipe network composed of many liquid pipes, said liquid pipes having a lead-in entrance and an outlet, and inner part of said liquid pipes being empty, said liquid pipe network comprising:

said many liquid pipes having more than one conducting wires, said conducting wires being fixed or inserted between said lead-in entrance and said outlet;

connection pipes physically connecting said each liquid pipe;

routers setting a transmission path of a signal, said signal transmitted through said conducting wires by turning on/off an electric connection state of said each conducting wire, said each conducting wire installed in each liquid pipe, said each liquid pipe linked by said connection pipes, by a control signal transmitted from outside; and a pulse tester connected with one end of said conducting wires, said pulse tester delivering pulse signals to said conducting wires, said pulse tester receiving reflected pulse signals reflected from a terminus of said conducting wires, and said pulse tester having an ID.

7. Said liquid pipe network of claim 6, wherein said routers comprise:

many connectors connected to said each conducting wire, said each conducting wire installed in said each liquid pipe;

a switch turning on/off an electric connection state of said each connector by said control signal; and a controller operating said switch by said control signal.

8. Said liquid pipe network of claim 6, wherein said routers further comprise a receiver for receiving said control signal.

9. Said liquid pipe network of claim 6, wherein said routers short said conducting wires, said conducting wires installed in one selected liquid pipe.

10. Said liquid pipe network of claim 6, wherein said pulse tester comprises a transmitter for transmitting an ID and said reflected pulse signals, said ID of said pulse tester.

11. A connecting method for water leakage detecting liquid pipes, said connecting method connecting a first liquid pipe with a second liquid pipe, said first liquid pipe and said second liquid pipe having more than one conducting wires, said conducting wires installed along an outer surface to detect water leakage between a lead-in entrance and an outlet, said connecting method for water leakage detecting liquid pipes comprising the steps of:

locating said first liquid pipe and said second liquid pipe in an position being installed;

physically connecting an outlet of said first liquid pipe with a lead-in entrance of said second liquid pipe; and electrically connecting said first liquid pipe with said second liquid pipe, wherein the step of electrically connecting said first liquid pipe with said second liquid pipe comprises the steps of:

forming an insertion groove in a predetermined location of the coating layer to expose said conducting wires;

installing connecting parts in said insertion groove, said connecting parts electrically linked to said conducting wires; and electrically connecting said each connecting part of said two liquid pipes.

12. A water leakage detecting system for a liquid pipe network composed of many liquid pipes, said water leakage detecting system detecting whether or not water leaks and a leaking area in said each liquid pipe, and said water leakage detecting system displaying a result, said water leakage detecting system comprising:

a field system delivering pulse signals to said each liquid pipe, and said field system transmitting reactive receiving signals; and a central management system deciding whether said each liquid pipe malfunctions by analyzing said receiving signals, said central management system calculating a defect-generated position if a defect is generated, and said central management system informing of said defect, wherein said field system comprising:

a liquid pipe having a lead-in entrance and an outlet, and said liquid pipe having more than one conducting wires between said lead-in entrance and said outlet; and a pulse tester connected to one end of said conducting wires, said pulse tester delivering pulse signals to said conducting wires, and said pulse tester receiving reflected signals.

13. Said water leakage detecting system for liquid pipe of claim 12, wherein said liquid pipe being plurally comprised, and many connecting parts is further comprised, said connecting parts connecting said liquid pipes, and said connecting parts comprise:

a wireless receiver receiving a control signal from outside, said control signal for controlling connection between conducting wires, said conducting wires installed in said each liquid pipe; and a switch part having many connectors, said connectors connected to said each conducting wires, said switch part turning on/off an electric connection between said conducting wires by turning on/off connection of said each connectors according to said control signal.

14. Said water leakage detecting system for liquid pipe of claim 12, wherein said central management system comprises:

a pipe network database including information on a connection method and length of said each liquid pipe; and a central processing unit detecting whether or not water leaks in said each liquid pipe by analyzing said receiving signals.

15. A constructing method for a liquid pipe network composed of many liquid pipes information data, said liquid pipe information data including exact length of each liquid pipe, at least one router and a pulse tester, said liquid pipes having more than one conducting wires, said router installed between said liquid pipes, said router switching connection of said conducting wires, said pulse tester connected to an end of said conducting wires, said pulse tester delivering pulse signals, and said pulse tester receiving reflected pulse signals, said constructing method for liquid pipe information data comprising the steps of:

applying a switching signal to said router;

receiving said reflected pulse signals from said pulse tester, said pulse tester linked to said liquid pipe network connected according to said switching signal;

calculating length of conducting wires of said liquid pipes and length of said liquid pipes through a receiving time of said reflected pulse signals; and storing said calculated length of said liquid pipes.

16. Said constructing method for liquid pipe information data of claim 15, wherein before the step of applying said switching signal to said router, said constructing method further comprising a step of:

storing liquid pipe network information, said liquid pipe network information including information on identifier, kind, length, and laid position of said each liquid pipe, said each liquid pipe constituting said liquid pipe network; said liquid pipe network information including information on kind and length of said conducting wires, said conducting wires installed in said each liquid pipe; and said liquid pipe network information including an identifier of said router.

17. Said constructing method for liquid pipe information data of claim 15, wherein the step of calculating length of said conducting wires of said liquid pipes and length of said liquid pipes through a receiving time of said reflected pulse signals, the step comprising the steps of:

calculating length of conducting wires of said liquid pipe by using a receiving time of said received reflected pulse signals; and calculating length of said liquid pipe by using said calculated length of said conducting wires of said liquid pipe.

18. A compensating method for length changes of reference length information, said length changes due to temperature, said reference length information for length of each liquid pipe of a liquid pipe network, said liquid pipe network composed of many liquid pipes, at least one router and pulse tester, said liquid pipes having more than one conducting wires, said router installed between said liquid pipes, said router switching connection of said conducting wires, said pulse tester connected to an end of said conducting wires, said pulse tester delivering pulse signals, and said pulse tester receiving reflected pulse signals, said compensating method comprising the steps of:

receiving said reflected pulse signals from a first optional liquid pipe constituting said liquid pipe network;

calculating length of said first liquid pipe by analyzing a receiving time of said reflected pulse signals;

comparing said calculated length of said first liquid pipe with length of a first liquid pipe stored in said reference length information, and calculating a changing rate; and updating reference length information of each liquid pipe, said each liquid pipe constituting said liquid pipe network by using said changing rate.

19. A detecting method for a leaking area of a liquid pipe network by using reference length information for length of each liquid pipe of said liquid pipe network, said liquid pipe network composed of many liquid pipes, at least one router and pulse tester, said liquid pipes having more than one conducting wires, said router installed between said liquid pipes, said router switching connection of said conducting wires, said pulse tester connected to an end of said conducting wires, said pulse tester delivering pulse signals, and said pulse tester receiving reflected pulse signals, said detecting method comprising the steps of:

compensating differences of said reference length information of said each liquid pipe, said each liquid pipe constituting said liquid pipe network, said differences owing to temperature;

delivering a control signal to said routers to set a path of said liquid pipes whose water leakage is detected;

receiving said reflected pulse signals from said pulse tester, said pulse tester installed in said set path for detecting water leakage; and calculating an exact water leakage area from said reflected pulse signals.

20. Said detecting method for a leaking area of a liquid pipe network of claim 19, wherein the step of compensating differences of said reference length information of said each liquid pipe, said each liquid pipe constituting said liquid pipe network, said difference owing to temperature, the step comprising the steps of:

receiving said reflected pulse signals of said pulse tester from a predetermined first liquid pipe of said liquid pipe network;

calculating length of said first liquid pipe by analyzing a receiving time of said reflected pulse signals;

comparing said calculated length of said first liquid pipe with length of said first liquid pipe stored in said reference length information, and calculating a changing rate; and updating reference length information of said each liquid pipe by using said changing rate.

21. A system for detecting water leakage in a liquid pipe network, said liquid pipe network composed of many liquid pipes, at least one router and pulse tester, said liquid pipes having more than one conducting wires, said router installed between said liquid pipes, said router switching connection of said conducting wires, said pulse tester connected to an end of said conducting wires, said pulse tester delivering pulse signals, and said pulse tester receiving reflected pulse signals, said water leakage detecting system in a liquid pipe network comprising:

a pipe network database including liquid pipe information, router information and pulse tester information, said liquid pipe information including reference length information of said each liquid pipe constituting said liquid pipe network; and a server system compensating differences of said reference length information, said differences owing to temperature, by using said reflected pulse signals transmitted from said pulse tester of said liquid pipe network, said server system delivering a control signal to said routers to set a path of said liquid pipes whose water leakage is detected, said server system receiving said reflected pulse signals from said pulse tester formed in said set path for detecting water leakage, and said server system calculating an exact water-leaking area from said reflected pulse signals.

22. Said system for detecting water leakage in a liquid pipe network of claim 21, in said pipe network database, wherein said liquid pipe information includes identification information, kind, length and laid position of said each liquid pipe, information on kind and length of said conducting wires installed in said each liquid pipe, said router information includes identification information and information on installed position, and said pulse tester information includes identification information and information on installed position.

23. Said system for detecting water leakage in a liquid pipe network of claim 21, wherein said compensation of differences of said reference length information, said difference owing to temperature, said compensation is implemented by receiving said reflected pulse signals of said pulse tester from a predetermined first liquid pipe of said liquid pipe network, calculating length of said first liquid pipe by analyzing a receiving time of said reflected pulse signals, comparing said calculated length of said first liquid pipe with said length of said first liquid pipe stored in said reference length information of said pipe network database to calculate a changing rate, and updating said reference length information of said each liquid pipe by using said changing rate.

* * * * *